United States Patent
Saunders et al.

(10) Patent No.: US 10,345,783 B2
(45) Date of Patent: Jul. 9, 2019

(54) AUTO BINDING OF TEMPLATES INTO EXITING SYSTEMS

(71) Applicant: Honeywell International Inc., Morristown, NJ (US)

(72) Inventors: Andrew Saunders, Richmond, VA (US); John Sublett, Richmond, VA (US); Robert Adams, Powhtan, VA (US); Craig Gemmill, Montpelier, VA (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/697,462

(22) Filed: Apr. 27, 2015

(65) Prior Publication Data

US 2018/0284715 A1    Oct. 4, 2018

(51) Int. Cl.
*G05B 19/05* (2006.01)
*G06F 17/24* (2006.01)
*G06F 16/903* (2019.01)

(52) U.S. Cl.
CPC ......... *G05B 19/056* (2013.01); *G06F 16/903* (2019.01); *G06F 17/248* (2013.01)

(58) Field of Classification Search
None
See application file for complete search history.

(56) References Cited

U.S. PATENT DOCUMENTS

| | | | |
|---|---|---|---|
| 5,613,117 | A | 3/1997 | Davidson et al. |
| 7,664,813 | B2 | 2/2010 | Petit et al. |
| 7,886,284 | B2 | 2/2011 | Haven et al. |
| 8,108,773 | B2 | 1/2012 | Fernstrom |
| 8,688,829 | B2 | 4/2014 | Lee et al. |
| 8,713,049 | B2 | 4/2014 | Jain et al. |
| 8,775,626 | B2 | 7/2014 | Teather et al. |
| 9,110,945 | B2 | 8/2015 | Jain et al. |
| 9,141,596 | B2 | 9/2015 | Meschkat et al. |

*Primary Examiner* — Craig C Dorais
(74) *Attorney, Agent, or Firm* — Seager, Tufte & Wickhem LLP

(57) ABSTRACT

A control system having packaged sets of control logic, referred to as templates. A template may be deployed in a system many times to solve a system's needs. Upon deployment, the user may need to perform many binding operations. The present system and approach may greatly reduce the labor involved in deploying control templates and in templates configuring a system of devices. Semantic tagging may be used. When designing a template, binding hints may be provided for each entity in the template that requires binding upon deployment. The binding hints may be used as a search predicate. When a template is deployed into a control space, a search query with binding hints for each bindable entity defined, may automatically be executed against the control space. If there is a single result for a bindable entity, then it may be automatically bound. If there are multiple results, a user may be prompted to choose from a results list.

13 Claims, 47 Drawing Sheets

AUTO BINDING OF TEMPLATES INTO EXISTING SYSTEMS

WORK FLOW OUTLINE

1. Define control template
   a. Create control logic
   b. Define required template inputs
      i. Define query tags for post deployment bindings
   c. Define required template outputs
      i. Define query tags for post deployment bindings
   d. Define required template inbound relations
      i. Define query tags for post deployment bindings
   e. Define required template outbound relations
      i. Define query tags for post deployment bindings
   f. Create Graphics for template 2. Save template in template library.

FIGURE 3

3. Deploy template to target device
   a. Copy logic to target device
   b. Copy graphics and images to target device
   c. For each template input
      i. Query target device for component sources that have the tags specified for this input.
      ii. If single search results, automatically bind this template input to the source.
      iii. If multiple search results, prompt the user to choose.
   d. For each template output
      i. Query target device for component targets that have the tags specified for this output.
      ii. If single search results, automatically bind this template output to the target.
      iii. If multiple search results, prompt the user to choose.

FIGURE 4 e. For each template inbound relation
   i. Query target device for component sources that have the tags specified for this relation.
   ii. If single search results, automatically relate this template to the source.
   iii. If multiple search results, prompt the user to choose.
f. For each template outbound relation
   i. Query target device for component targets that have the tags specified for this relation.
   ii. If single search results, automatically relate this template to the target.
   iii. If multiple search results, prompt the user to choose.

FIGURE 5

4. Post deployment operations
   a. For each deployed template in a control device
      i. Flag unbound inputs, outputs, and relations
   b. Periodically or at user request
      i. Repeat steps 3.c, d, e, & f above for any unresolved inputs, outputs, or relations.

| Path | TemplateName | Vendor | Version | Inputs | Outputs | Relations |
|---|---|---|---|---|---|---|
| /playground/SupplyAirResetNew | SupplyAirResetNew | Tridium | 1.0 | 3 | 1 | 0 |
| /playground/SupplyAirResetNew1 | SupplyAirResetNew | Tridium | 1.0 | 3 | 1 | 0 |
| /playground/SupplyAirResetNew2 | SupplyAirResetNew | Tridium | 1.0 | 3 | 1 | 0 |
| /playground/SupplyAirResetNew3 | SupplyAirResetNew | Tridium | 1.0 | 3 | 1 | |

| Template Manager | | | | | | |
|---|---|---|---|---|---|---|
| | | | | | 6 objects | |
| Path | TemplateName | Vendor | Version | Inputs | Outputs | |
| /Drivers/ModbusTcpNetwork/ModbusTestTemplate | ModbusTestTemplate | Tridium | 1.0 | 1 | 1 | |
| /Drivers/ModbusTcpNetwork/ModbusTestTemplate5 | ModbusTestTemplate | Tridium | 1.0 | 1 | 1 | |
| /Drivers/ModbusTcpNetwork/ModbusTestTemplate6 | ModbusTestTemplate | Tridium | 1.0 | 1 | 1 | |
| /Drivers/AsoNetwork/HeatExchanger8 | HeatExchanger1 | Tridium | 1.0 | 1 | 0 | |
| /templateTest/SupplyAirReset | SupplyAirReset | Tridium | 1.0 | 3 | 1 | |
| /templateTest/SupplyAirReset1 | SupplyAirReset | Tridium | 1.0 | 3 | 1 | SAT_in10<br>FanStatus_in10 |

# AUTO BINDING OF TEMPLATES INTO EXITING SYSTEMS

BACKGROUND

The present disclosure pertains to control systems and particularly to packaged sets of control logic.

SUMMARY

The disclosure reveals engineering a control system having packaged sets of control logic, which may be referred to as templates. A template may be deployed in a system many times to solve a system's needs. Upon deployment, the user may need to perform many binding operations. The present system and approach may greatly reduce the labor involved in deploying control templates. Semantic tagging may be used. When designing a template, binding hints may be provided for each entity in the template that requires binding upon deployment. The binding hints may be used as a search predicate. When a template is deployed into a control space, a search query with binding hints for each bindable entity defined, may automatically be executed against the control space. If there is a single result for a bindable entity, then it may be automatically bound. If there are multiple results, a user may be prompted to choose from a results list.

BRIEF DESCRIPTION OF THE DRAWING

FIGS. 3-6 are diagrams of a work flow outline for auto binding templates into an existing system;

FIG. 9 is a diagram of a screen that results when the component tab is clicked on;

FIG. 10 is a diagram of a screen that results when the configuration tab is clicked on;

FIG. 14 is a diagram of a screen that shows a list of the relation ID's found in the installed tag dictionaries;

FIG. 24 is a diagram of a screen where certain tags may be editable;

FIG. 41 is a diagram of a view showing a template manager;

FIG. 46 is a diagram of a template manager screen that may assist in linking unlinked template inputs, outputs and relations.

DESCRIPTION

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

When engineering a control system, there may be packaged sets of control logic including, but not limited to, control logic, user interface, graphics, alarms, data collection, configuration properties, inputs, outputs and relations. These packages may be called templates.

A specific template may be deployed in a system many times to solve the system's needs. When a template is deployed into a system, the user may need to perform many "binding" operations. These may be typically hardware bindings, input bindings, output bindings, and relationship bindings.

The binding process may be very labor intensive, as there can be a very large number of choices for each type of bindings. The present approach may greatly reduce the labor involved in deploying control templates.

The present control template approach may use semantic tagging. The template designer, when designing a template, may provide binding hints ("bindingHints") for each entity in the template that requires binding upon deployment. The binding hints may be used as a search predicate.

When a template is deployed into a control space, a search query with binding hints for each bindable entity defined may automatically be executed against the control space. If there is only a single result for a bindable entity, then it may automatically be bound. If there are multiple results, the user may be prompted to choose from a results list.

The systems and approaches noted herein may be implemented in a Niagara™ 4 data model, workbench and/or tools incorporating a processor and/or controller. The Niagara™ 4 data model and tools may be products of Tridium™, Inc.

Figure 1:
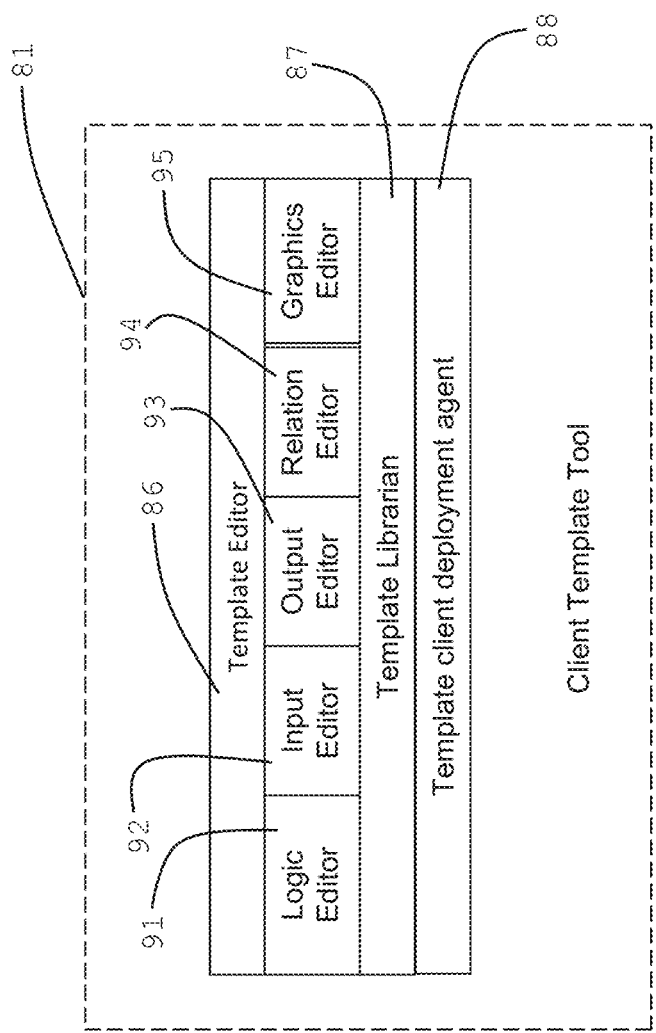
FIG. 1 is a diagram of a client template tool.
Figure 2:
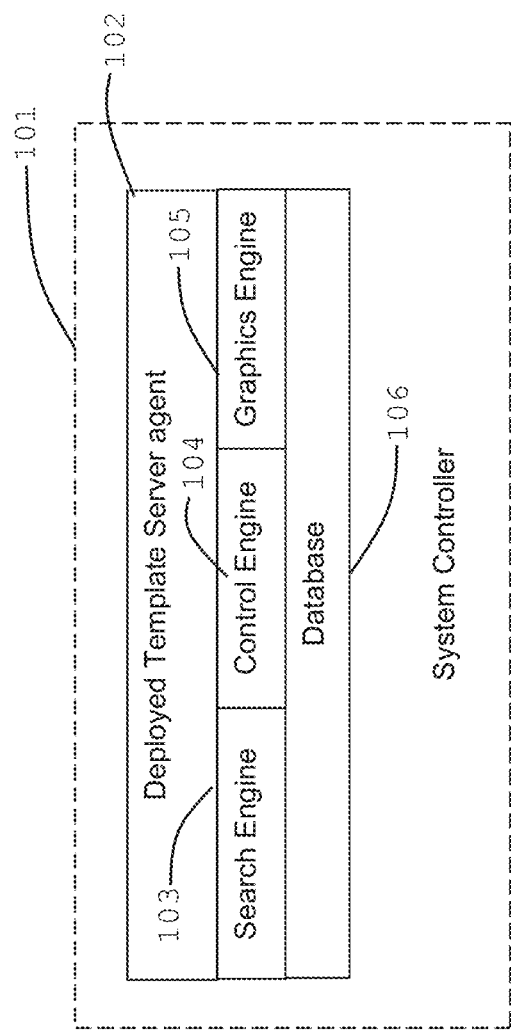
FIG. 2 is a diagram of a system controller that may incorporate a deployed template server agent.
Figure 6:
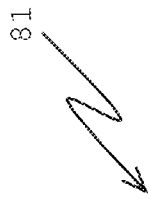

FIGS. 1 and 2 are diagrams relating to auto binding of templates into systems. FIG. 1 is a diagram of a client template tool 85. Tool 85 may incorporate a template editor 86, a template librarian 87, and template client deployment agent 88. The editor portion may incorporate a logic editor 91, an input editor 92, an output editor 93, relation editor 94 and graphics editor 95.

FIG. 2 is a diagram of a system controller 101. Controller 101 may incorporate a deployed template server agent 102. There may be a search engine 103, control engine 104, a graphics engine 105 and a database 106 incorporated by controller 101.

A work flow outline for auto binding templates into existing system may be noted in the following and a chart 81 of FIGS. 3-6. A control template may be defined. Control logic may be created. Required template units may be defined. Required template outputs may be defined. Required template inbound relations may be defined. Required template outbound relations may be defined. Query tags for post deployment bindings may be defined for the required template units, template outputs, template inbound relations and template outbound relations. Graphics for a template may be created.

The template may be saved in a template library.

A template may be deployed to a target device. One may note distinction between the target device to which the template is being deployed (typically a Niagara Framework device), and the device being controlled by the target device (which may be a Niagara device, or another device from any other manufacturer, accessible through BACnet™, LONworks™, Modbus™, or any other mechanism), through the control logic in the template. A little later herein, "target device" again the physical device being referenced in that sense may be different.

Logic may be copied to the target device. Graphics and images may be copied to the target device. For each template input a target device for component sources that have the tags specified for this input may be queried, and if a single search results, it may automatically bind this template input to the source, and if a multiple search results, the user may be prompted to choose. For each template output, a target device for component targets that have the tags specified for this output may be queried, and if a single search results, it may automatically bind this template output to the target, and if a multiple search results, the user may be prompted to choose. For each template inbound relation, a target device for component sources that have the tags specified for this relation may be queried, and if a single search results, it may automatically bind this template output to the source, and if a multiple search results, the user may be prompted to choose. For each template outbound relation, a target device for component targets that have the tags specified for this relation may be queried, and if a single search results, it may automatically bind this template output to the target, and if a multiple search results, the user may be prompted to choose.

Post deployment operations may be noted. For each deployed template in a control device, unbound inputs, outputs, and relations may be flagged. Periodically or at a user's request, the above steps pertaining to each template input, each template output, each template inbound relation and each template outbound relation may be repeated for any unresolved inputs, outputs, or relations.

The following may describe a work flow for creating, deploying, and managing Niagara™ 4 templates. A Niagara template may be a deployable package of Niagara objects. Templates may contain a component tree with a single base component and associated support objects. A template may be contained in a file using an .ntpl file extension. Template files may be grouped into modules for ease of distribution. One or more instances of a template may be deployed to a station.

The purpose of templates may be to allow a set of configured objects to be encapsulate and deployed as a unit. The goal may be to eliminate unnecessary repetition of configuration steps when making multiple installations with similar functionality. The deploy process may extend the normal installation processes used for a single component. At deployment the user may only need to make modifications unique to that installed instance.

Mechanisms may be provided to designate certain properties in the template component tree as special configuration or linkable input/output properties. Configuration properties may be properties that a user would set to customize different deployed instances of the template. I/O properties may be properties that the template designer would expect to be linked after deployment.

The template designer may be the one who creates and maintains the template. The template user may be the one who deploys the template and configures the installed instance. The designer and the user may be the same person.

A template service may provide management support for templates that are deployed in this station. One of its primary functions may be to identify unlinked template inputs and help resolve them. The template service should be installed in the running station to take advantage of this feature.

The template designer may use a graphical user interface such as, for example, a Niagara one, to create and edit templates. The concept may be to fully engineer a collection of "tagged" control logic and self-contained graphics with a single component as the root. A typical example may be a BDevice of Niagara or other equivalent item that contains a collection of proxy points, control logic, and, graphics. It may be important that the appropriate tags have been added to the components.

Things to consider when designing a template may incorporate identifying the desired function of the template control logic, and identifying any external inputs are required by the template functionality. Designers may typically expose the input slots of writable points. Also, one may identify the configuration properties of the template. These may typically be selected properties of components contained in the template. An example may be alarm limits of a point alarm extension. Also, one may identify any outputs produced by the template functionality for external consumption. Designers may typically expose the out slots of control points. One may identify the any graphic views requirements of the template. All graphic binding should be contained within a template component tree. Also, one may identify the tagging requirements of the template and identify any Relations such those of Niagara, or other relations that need to be established upon deployment.

Figure 7:
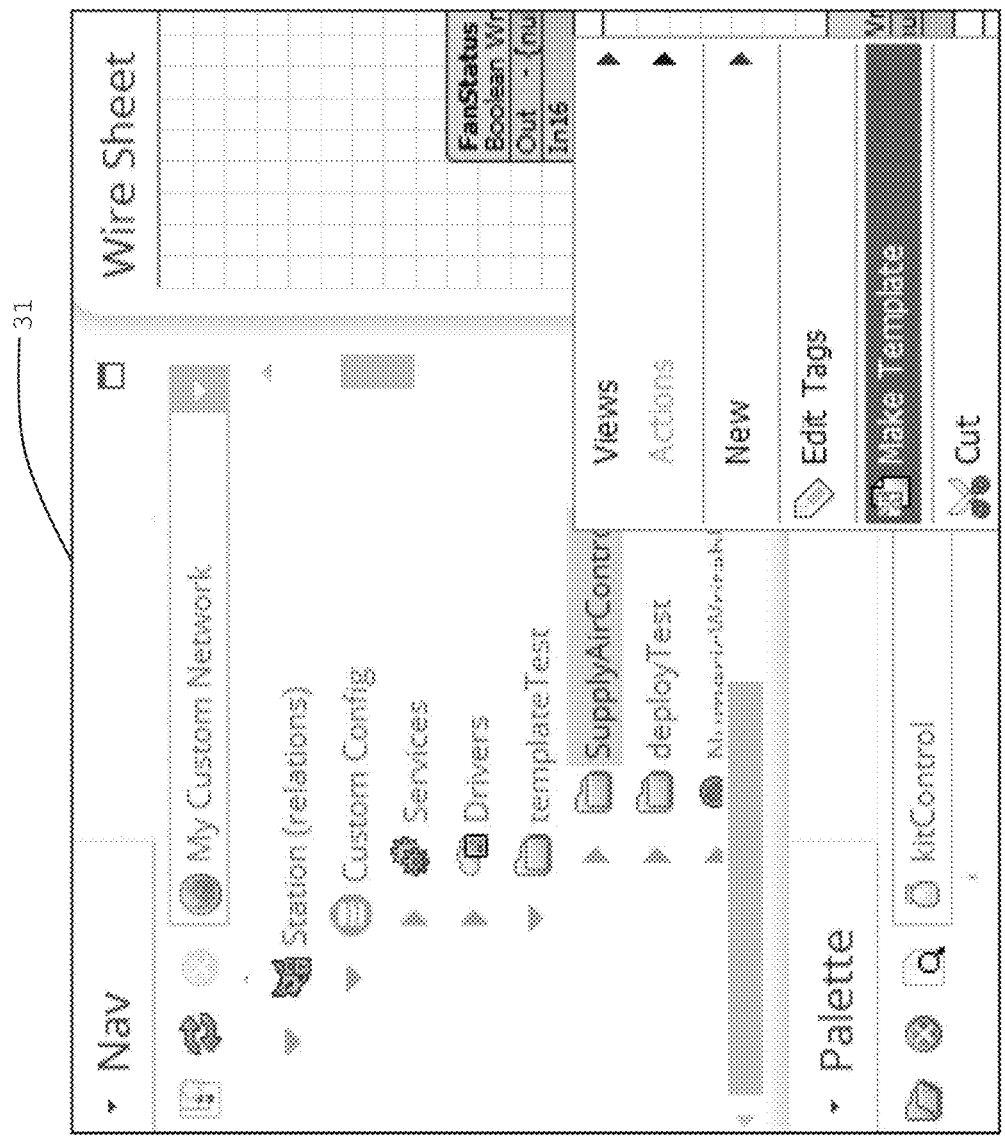
FIG. 7 is a diagram showing a popup menu showing a "Make Template" for clicking on that may open up a new template.
Figure 8:
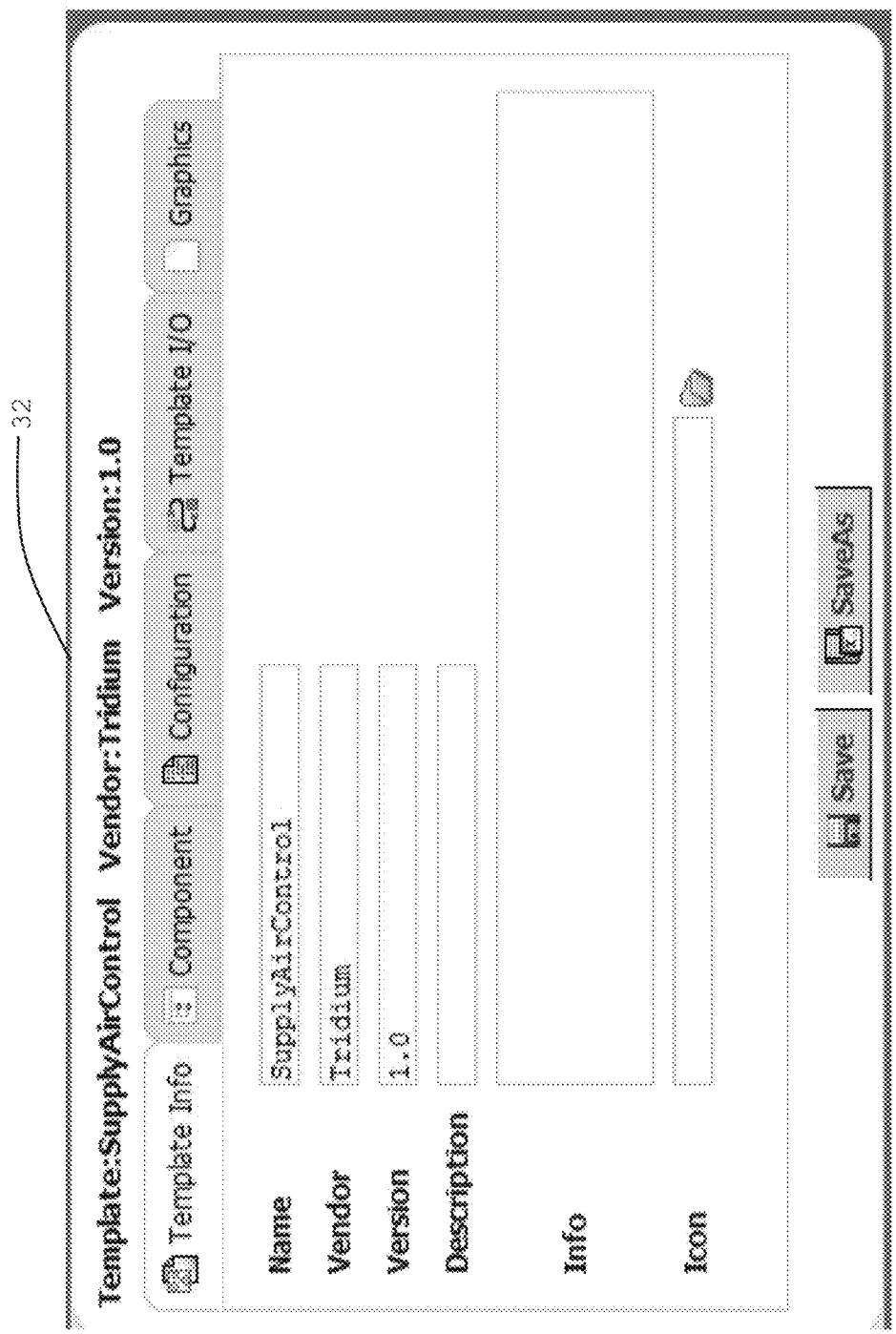
FIG. 8 is a diagram of a screen having template info, component, configuration, template I/O and graphics tabs.
Figure 9:
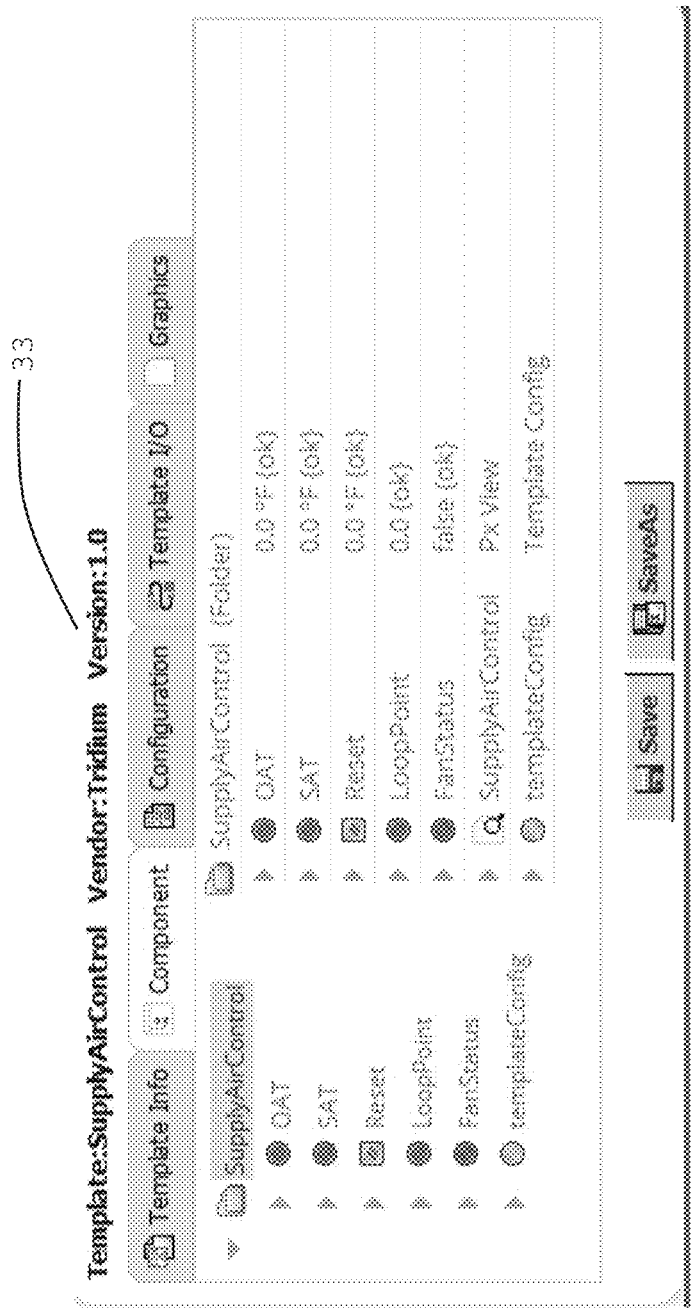
Figure 10:
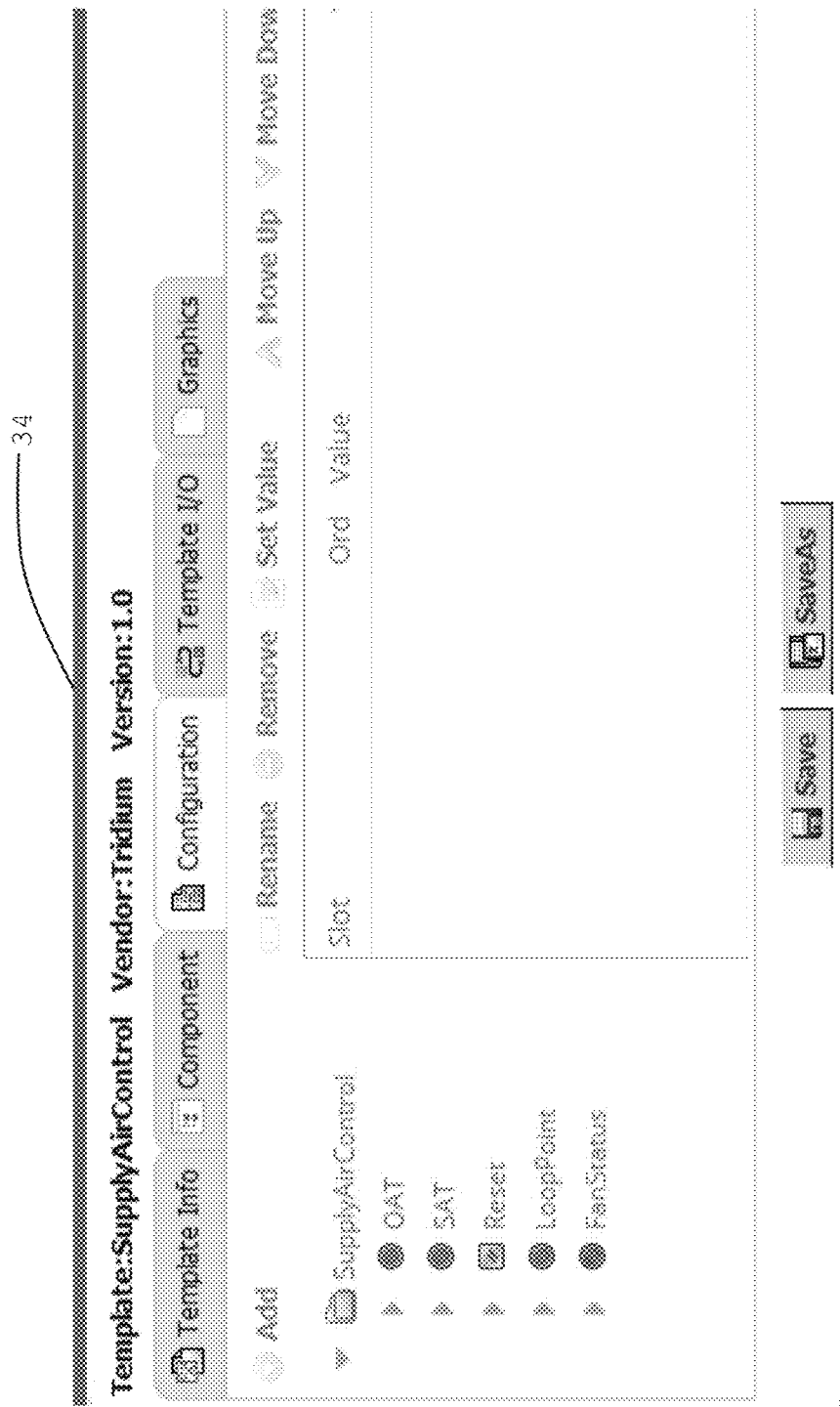
Figure 11:
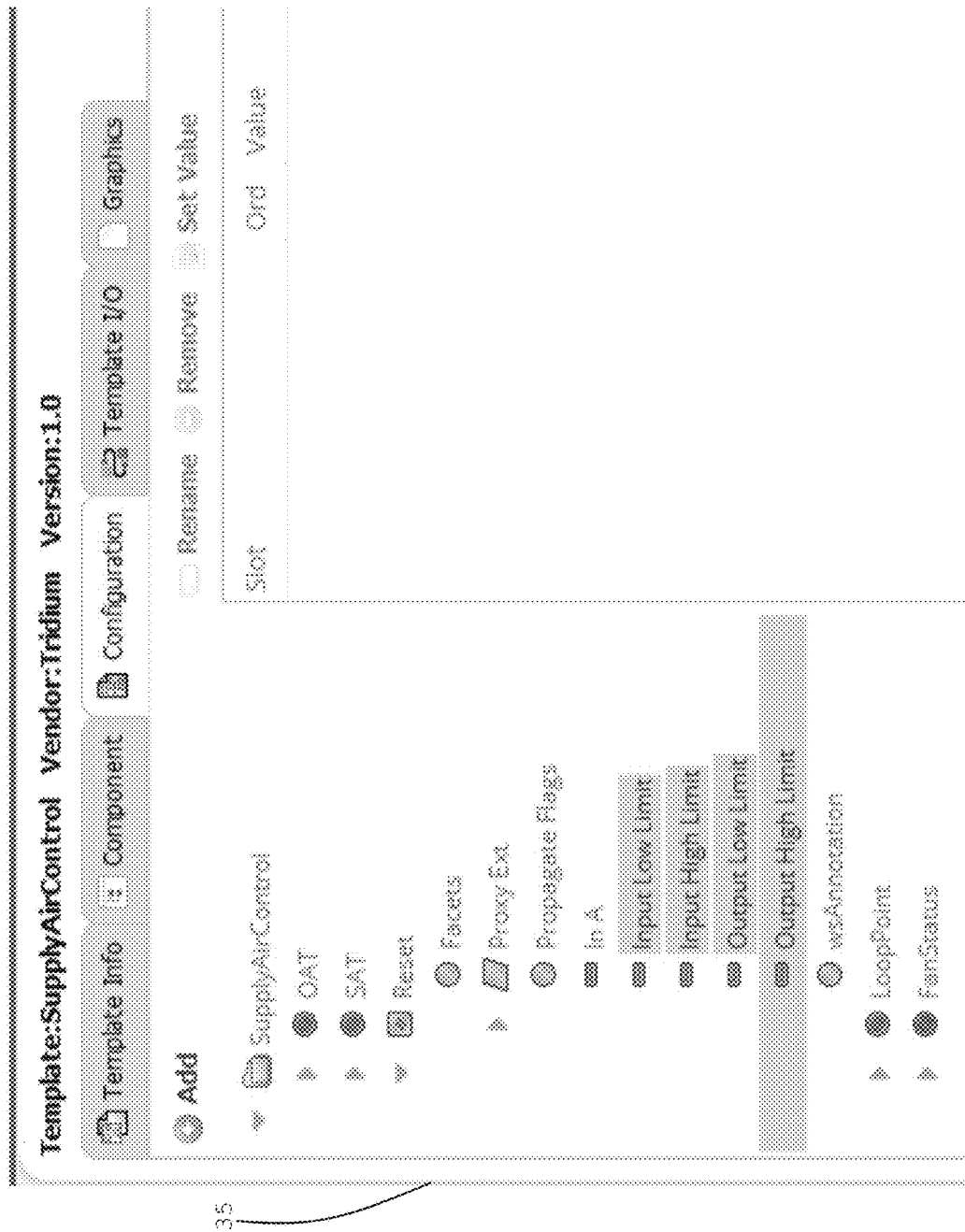
FIG. 11-13 are diagrams which indicate an approach for setting a value for each configuration property.
Figure 12:
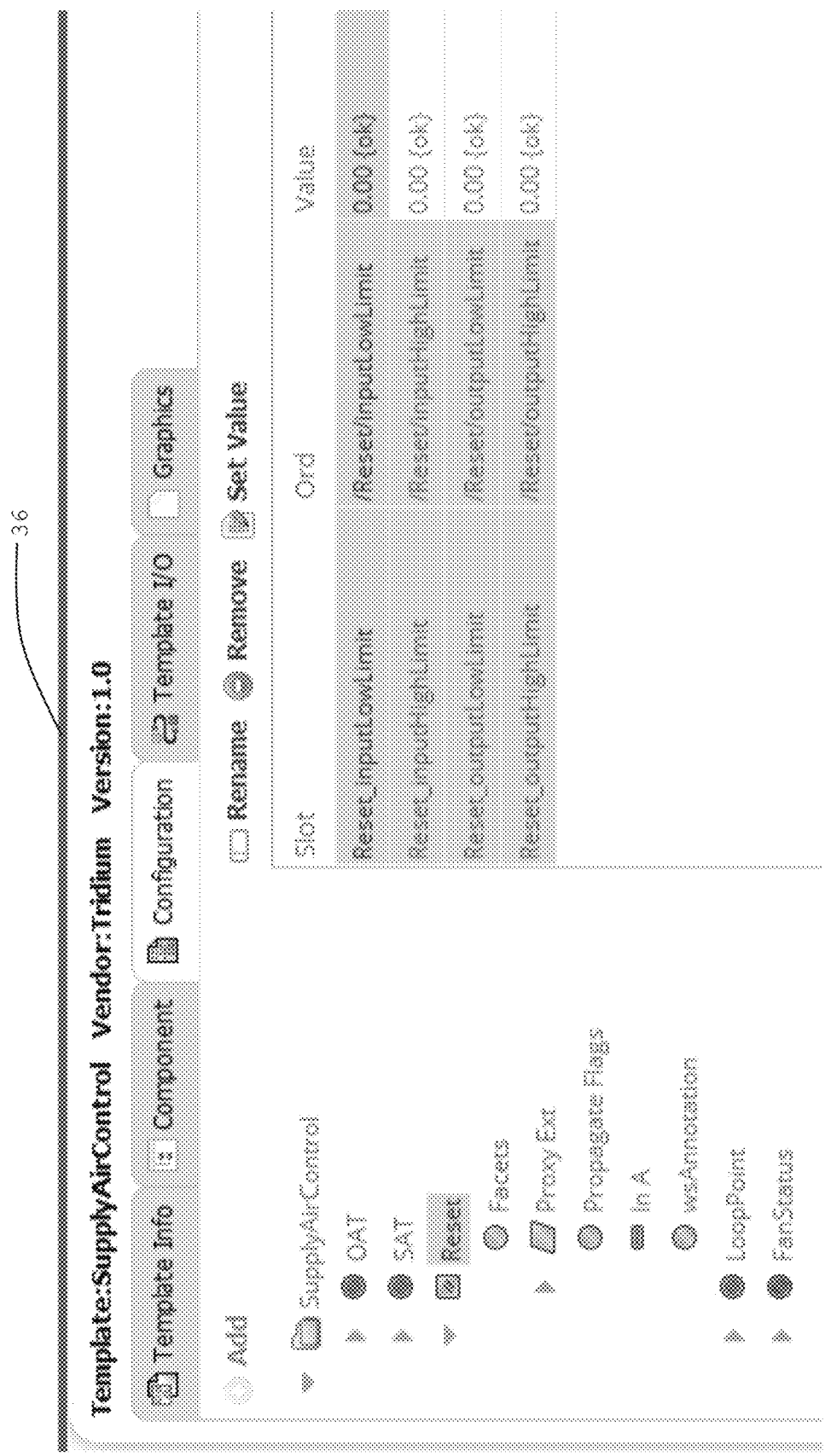
Figure 13:
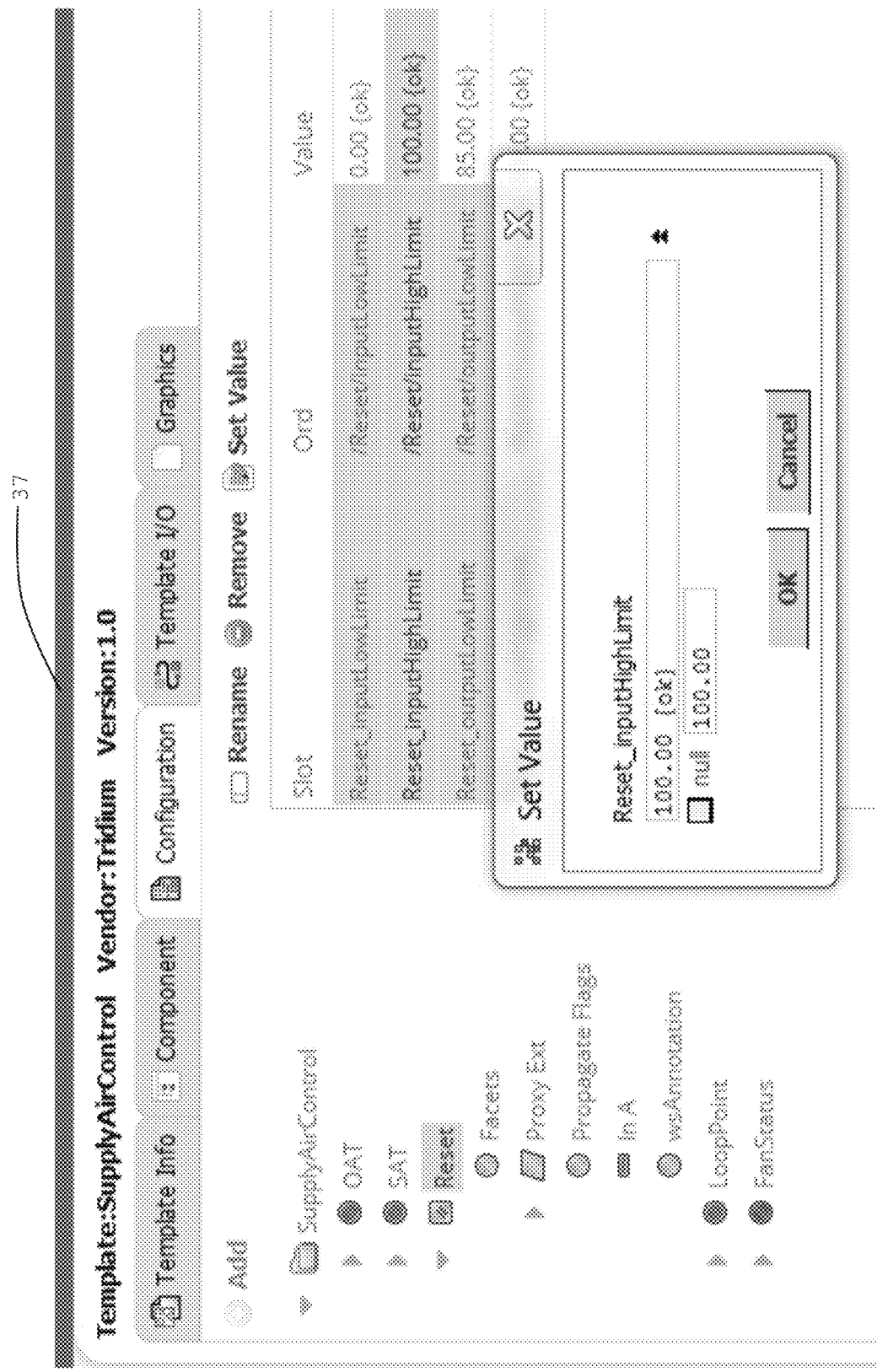

The simplified steps for creating a new template may incorporate: 1) Using a client template tool, create the desired collection of control logic; 2) Using an appropriate tagging tool, apply tags to the desired components; 3) Creating the required graphic view and applying it to the desired components; and 4) Right clicking on a root component and selecting Make Template from a popup menu in screen 31 of FIG. 7. This may open up the newly created template in the template editor. The template name may default to the name of the component that it was created from. The steps may also incorporate: 5) Clicking on the Template Info tab and edit as desired; and 6) Clicking on the Component tab in screen 32 of FIG. 8. This view may present a component view of the template. Screen 31 view may have a Nav tree (a view that is used for navigation around a graph database) in the left pane and Property Sheet, Wire Sheet, or Slot Sheet views in the right pane. These views may be selected by right clicking on the template root component and then selecting the desired view. By using this tab one may make changes to the template's control logic by adding or removing components as well as adding or removing links. A step may incorporate 7) Clicking on the Configuration tab. One may note screen 33 and 34 in FIGS. 9 and 10. The tab may allow one to select and expose specific component properties contained within the template control logic. When the template is deployed, the user may be prompted to make edit changes to these values. To select a property to expose as a template configuration property, one may click on the expansion icons in the nav pane until the desired property is exposed in the nav tree. One may select one or more properties to expose. One may add the property by double-clicking on the property or selecting and click on the Add icon. One may note screen 35 in FIG. 11. One may edit the default value for each configuration property by double-clicking on a Value cell or selecting a row and clicking on the Set Value icon. An edit dialog may pop-up. One may note screens 36 and 37 in FIGS. 12 and 13.

Figure 14:
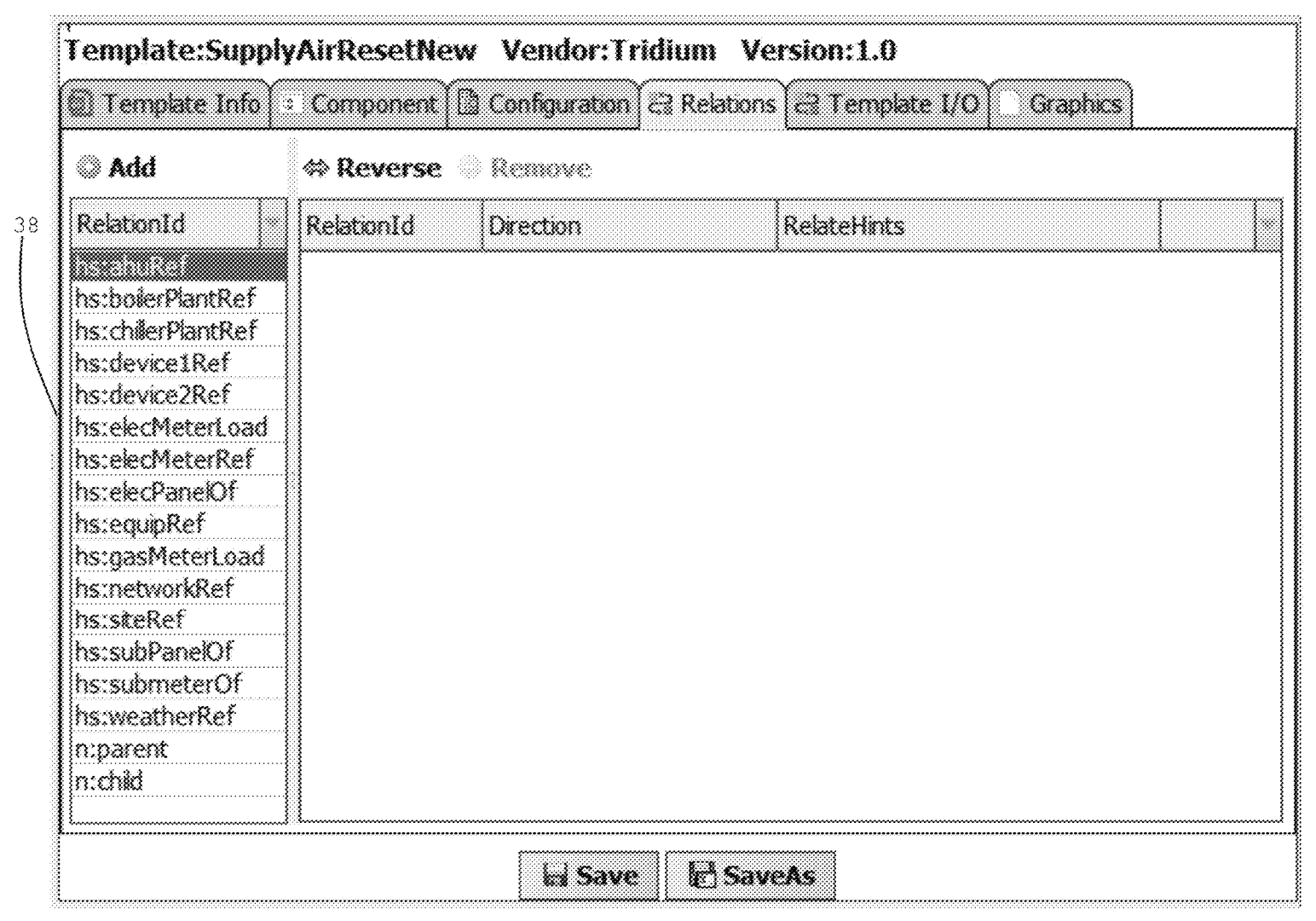
Figure 15:
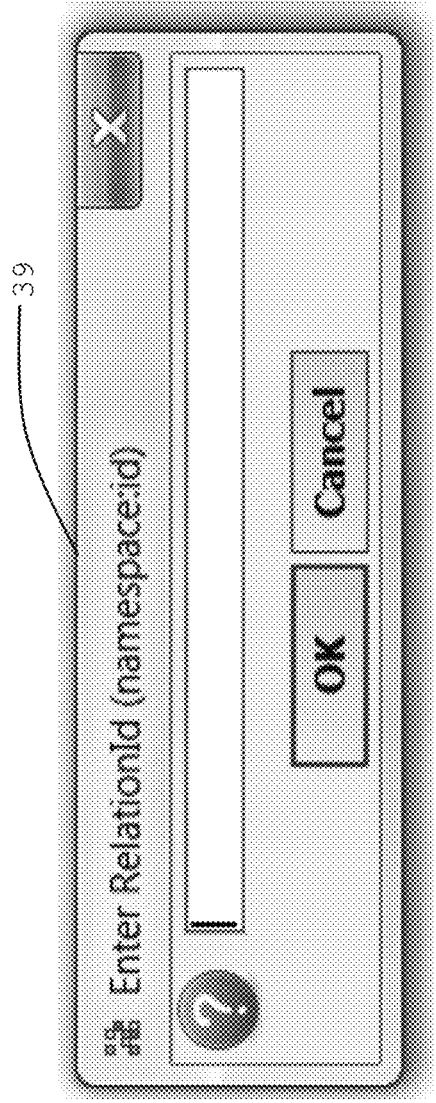
FIG. 15 is a diagram of a dialog for entering a relation ID.

Another step may incorporate 8) Clicking on the Relations tab. This tab may allow one to define any relations that are desired between the root component of this template and other components in the station in which the template is deployed. The left pane provides a list of all Relations Id's found in the installed Tag Dictionaries. One may note screen 38 of FIG. 14. The right pane may show the relations that have been added to the template. To add a relation to the template, one may click on the desired RelationId in the left pane and then click the button. Alternately, one may double-click on the desired RelationId. To add an "ad hoc" relation, i.e., a relation ID that is not in a TagDictionary, one may click the button without a RelationId selected. A dialog 39 in FIG. 15 may appear to enter a relationId.

Figure 16:
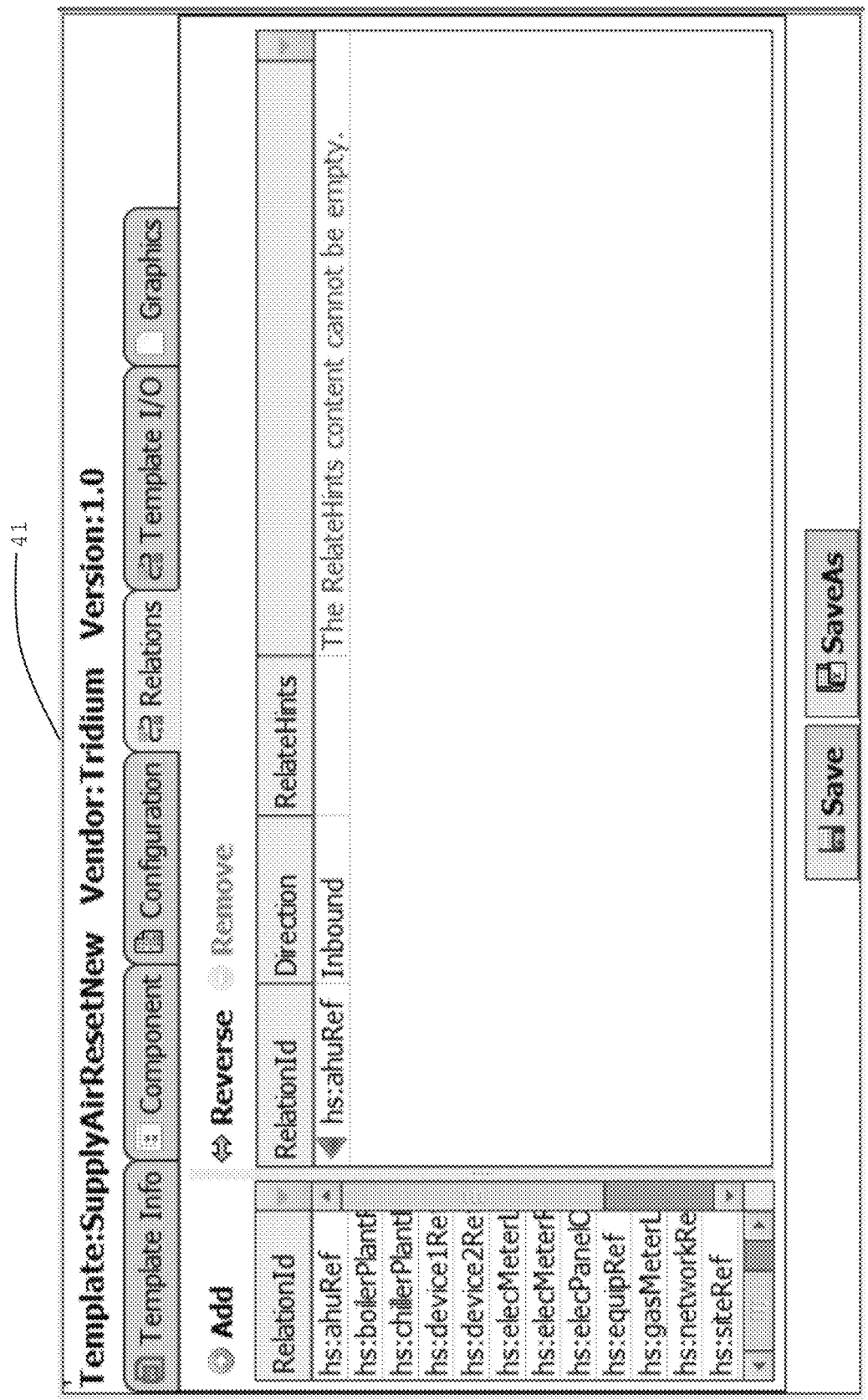
FIG. 16 is a diagram of an added relation which has a direction that may be reversed.
Figure 17:
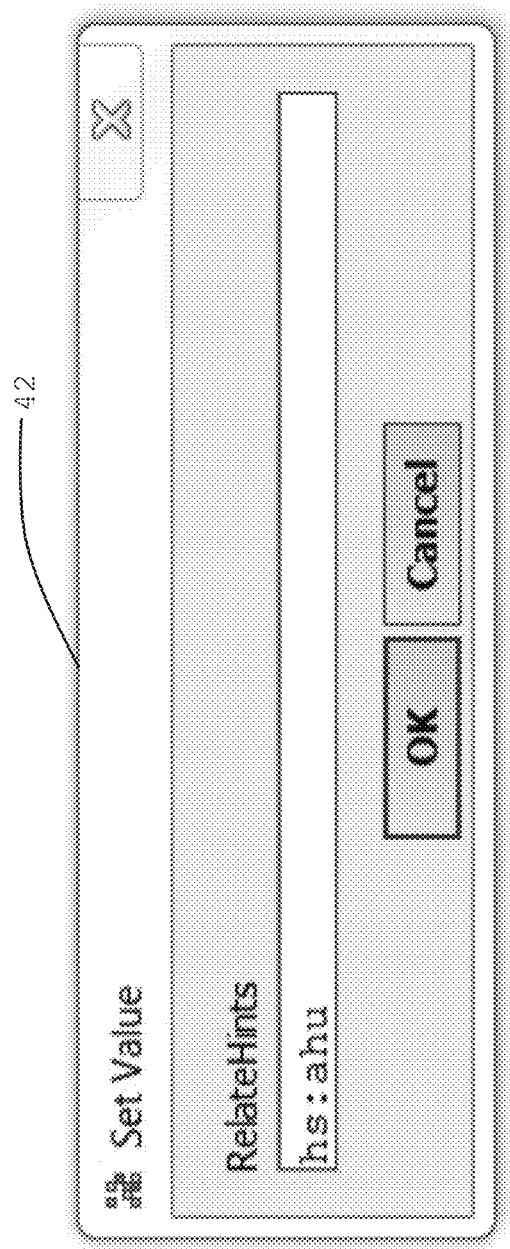
FIG. 17 is a diagram of a set value dialog for entry of a search predicate.

A relation direction may be a direction used to define if the relation is an "inbound" or "outbound" relation. An example of an inbound relation may be a VAV controller that could have an hs:ahuRef relation to a component that represents an AHU. When the relationId is added, it may default the direction to "inbound". To change the direction, click on the button. The red indication may show that a value needs to be set for the RelateHints. One may note screen 41 in FIG. 16. One may enter RelateHints. RelateHints may be a neql search predicate (of Niagara entity query language) or other search predicate, and may be used during template deployment to search and suggest potential related components. To edit the RelateHints, one may select a row and double-click on a RelateHints value cell. A Set Value dialog 42 may popup as indicated in FIG. 17. Upon entry, a value entered may be evaluated to determine if it is a valid search predicate. If it is not, it will be indicated in a table.

Figure 18:
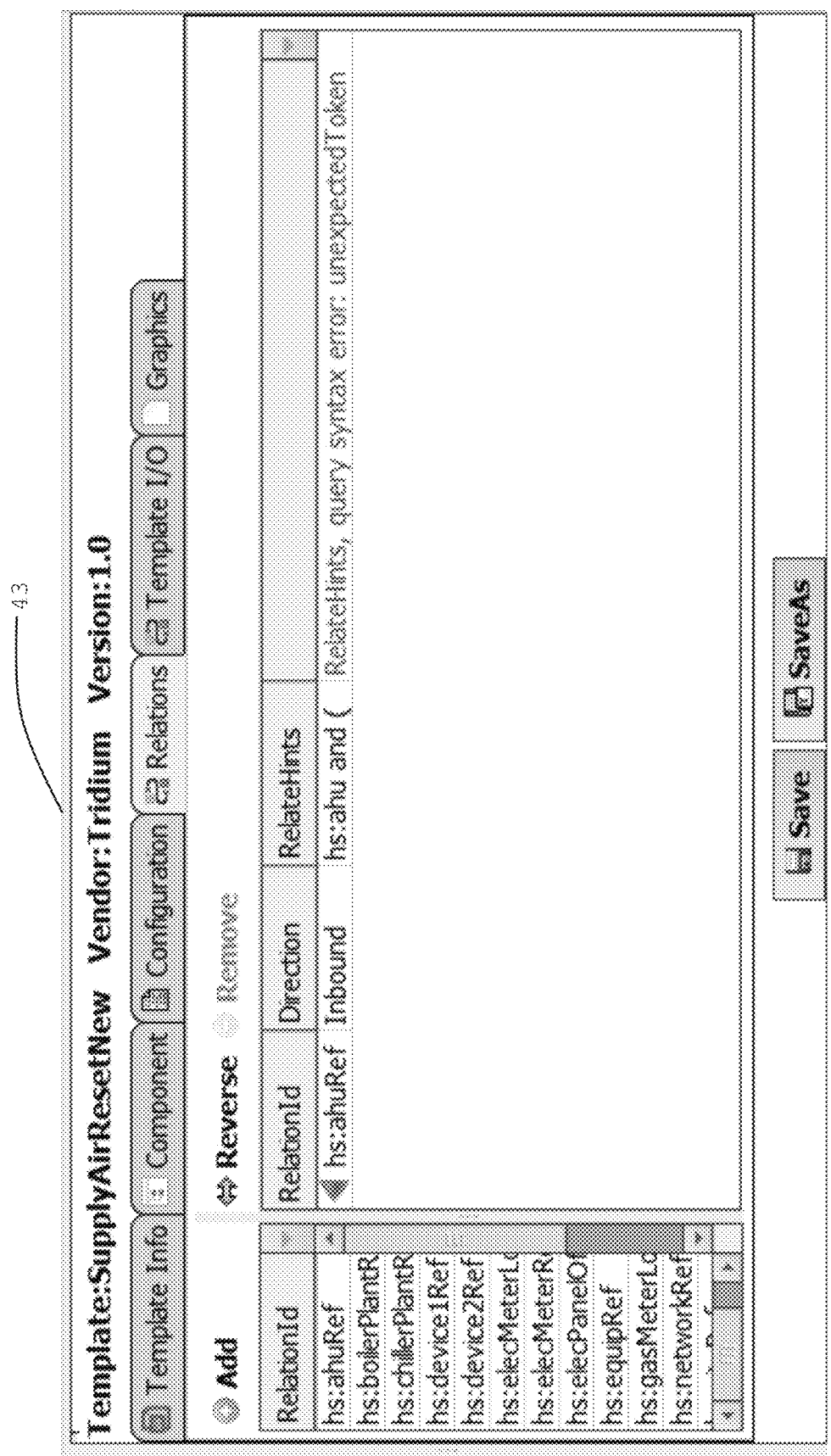
FIG. 18 is a diagram of a screen which may indicate whether the syntax of the search predicate is correct.
Figure 19:
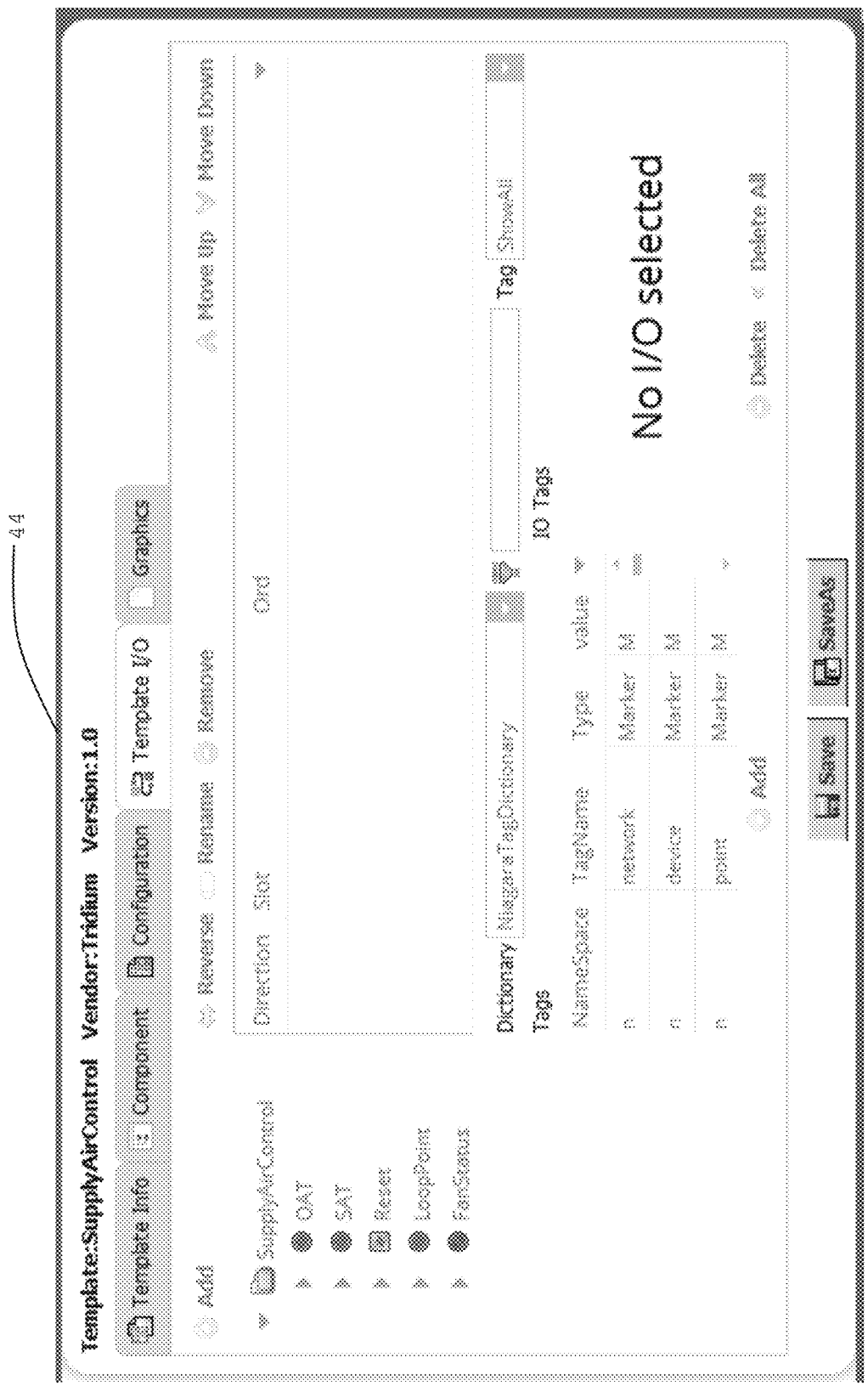
FIGS. 19-21 are diagrams of screens with information on various tags.

Another step may incorporate 9) Clicking on the Template I/O tab. This tab may allow one to expose control inputs that are required by the template and control outputs provided by the template. One may note screen 43 in FIG. 18. The left pane may contain a nav pane providing access to all of the child Control Points contained by the template. One may note screen 44 in FIG. 19. The upper right pane may display the current template inputs and outputs. The lower right pane may be used to display and apply tags to each of the inputs and outputs. The left side of this pane may allow one to select tags for tag dictionaries. The right side of the pane may display the tags for the currently selected input or output in the upper right pane.

Figure 20:
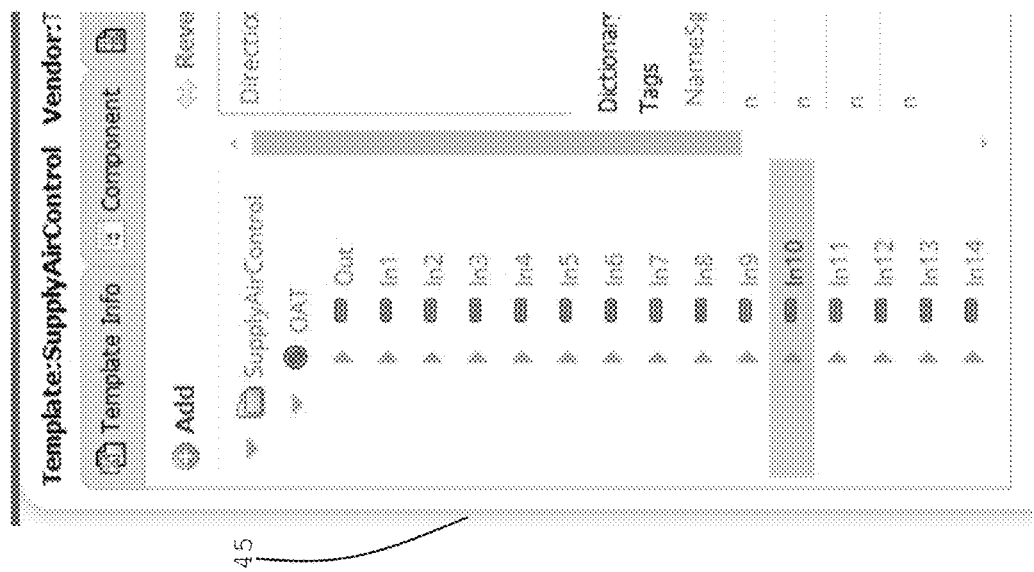
Figure 21:
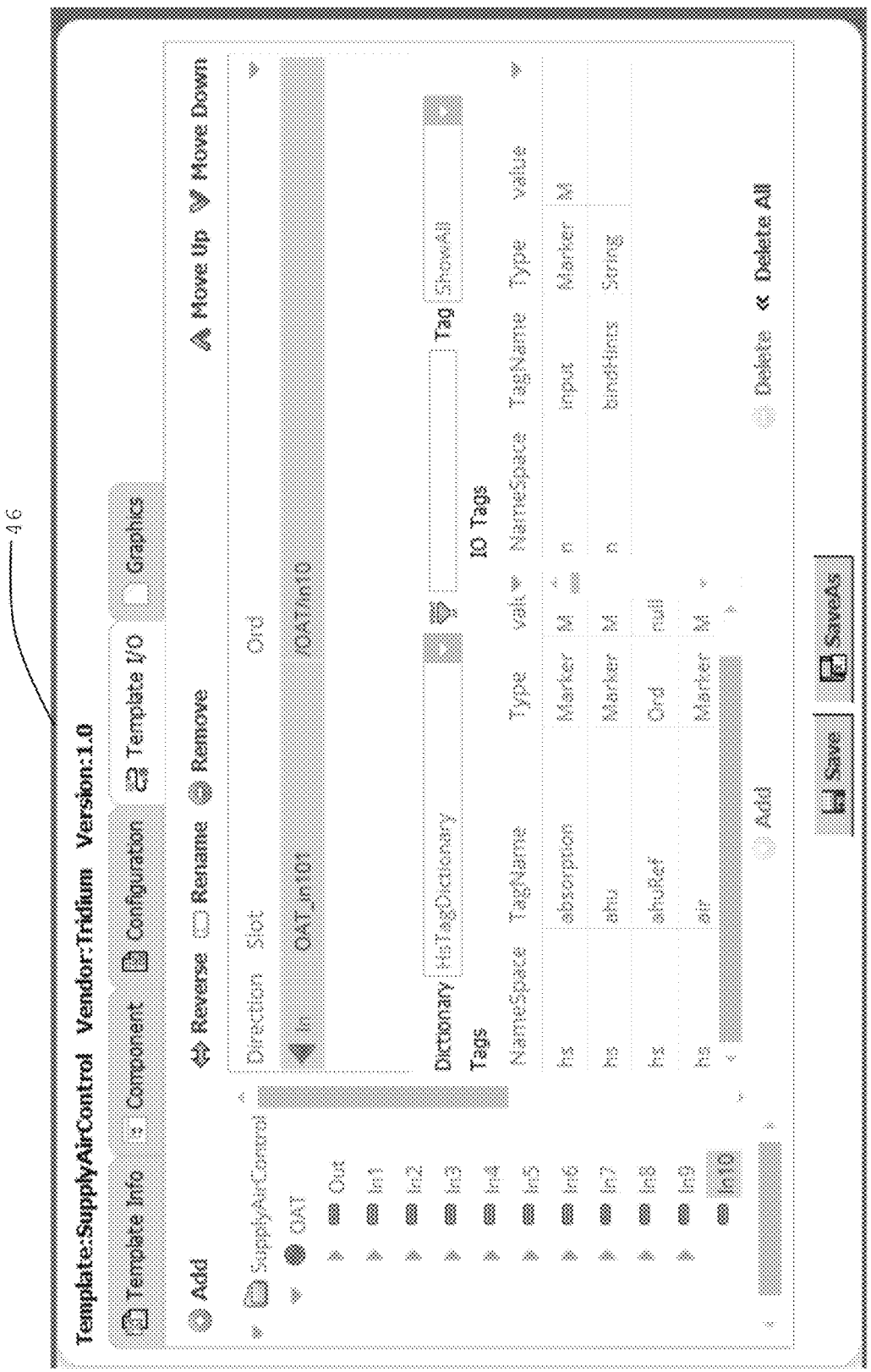

To create a template input, one may select and expand the desired control point in the nav pane. One may add the input by double-clicking on the desired point input or clicking on the add icon. One may note screen 45 in FIG. 20. One may note in the IO Tags pane (lower right pane) an addition of n:input and n:bindHints tags. If the source point was tagged, these tags may also automatically have been included. One may note screen 46 in FIG. 21.

One may add/edit tags on the Input. A primary use for tagging the input or output may be to assist the installation tool when deploying the template in resolving the required template inputs. The n:bindHints tag may be the tag that is used.

One may edit the n:bindHints tag. The tag may be a string value that is used as a neql search predicate. In this particular example, the input may be for the current outside air temperature and one may be using the HaystackTagDictionary. Therefore, the neql search predicate may be: "hs:outside and hs:air and hs:temp and hs:sensor".

Figure 22:
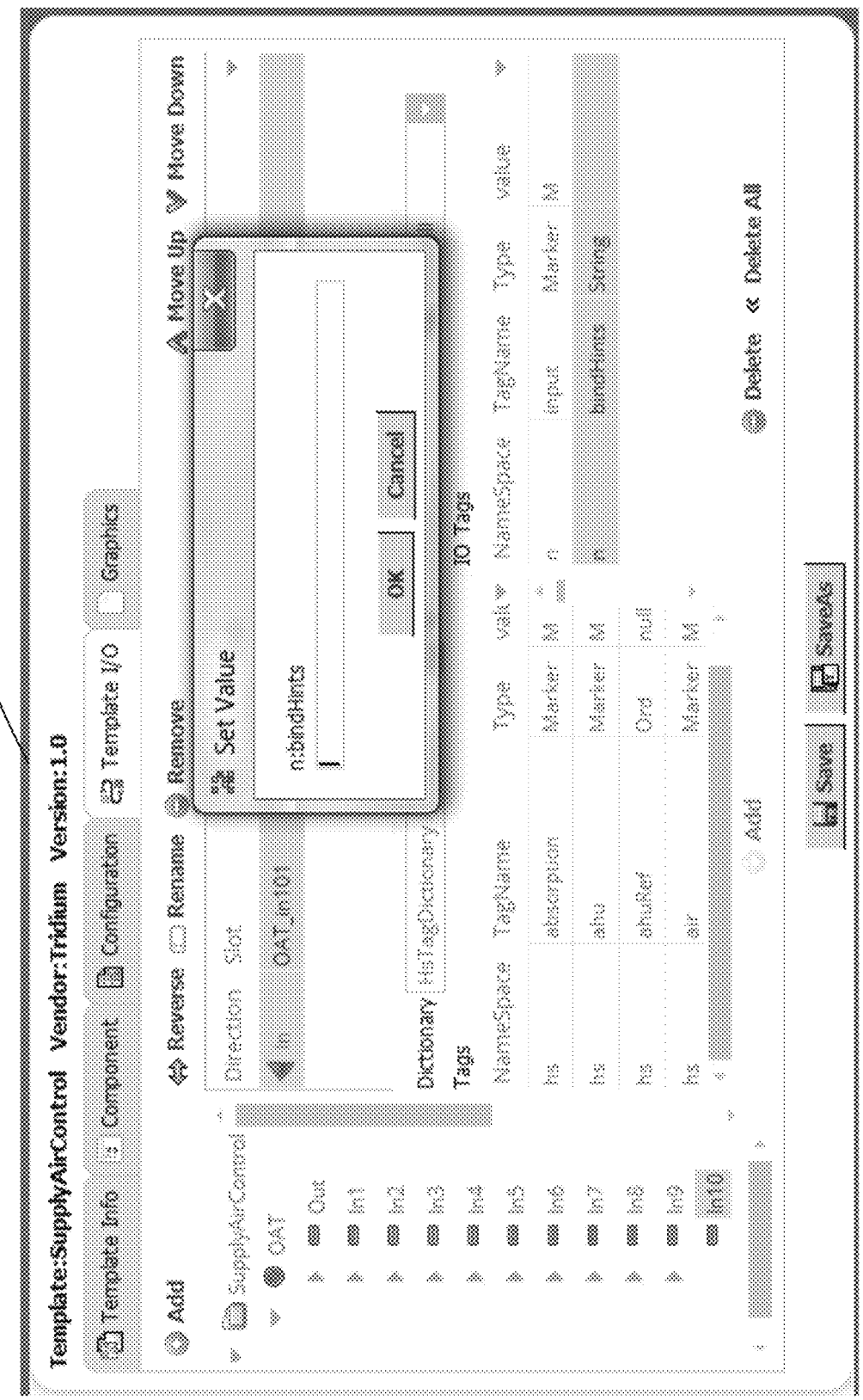
FIG. 22 is a diagram of a screen having a dialog for setting a value for a bind hints tag.
Figure 23:
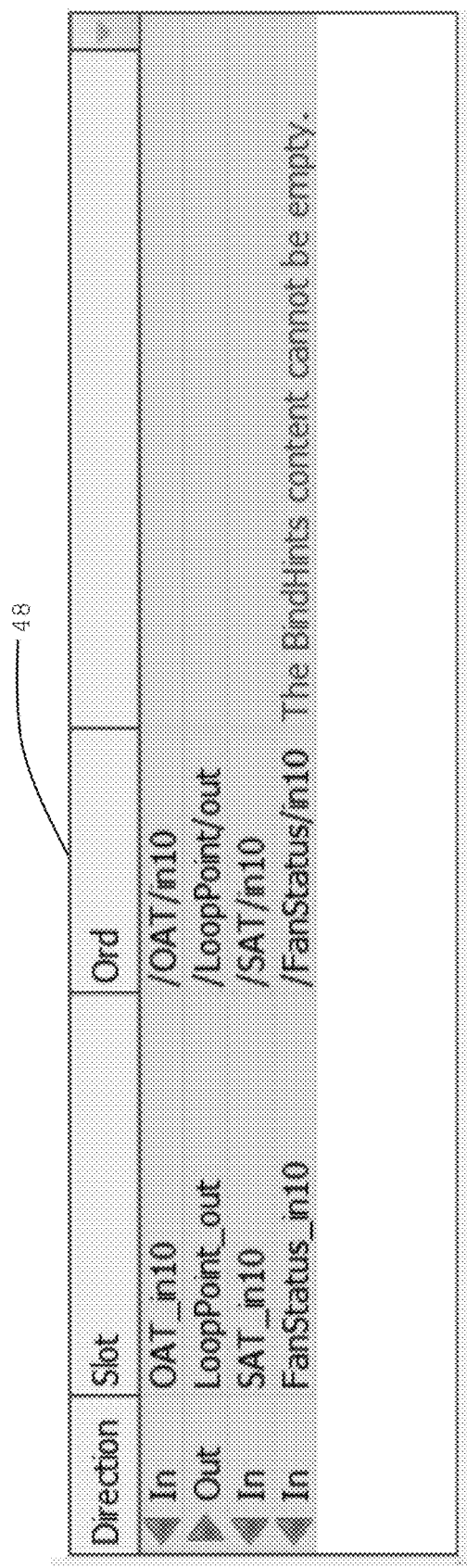
FIG. 23 is a diagram of a screen where a bind hint value may be validated.

To edit the n:bindHints tag, one may select the bindHints row of the IO Tags pane and double-click on the value cell. A Set Value dialog may popup. One may note screen 47 of FIG. 22. One may edit the value and click OK. Similar to RelationHints, the bindHint value may be validated upon entry and any errors may be indicated in the I/O table.

Figure 24:
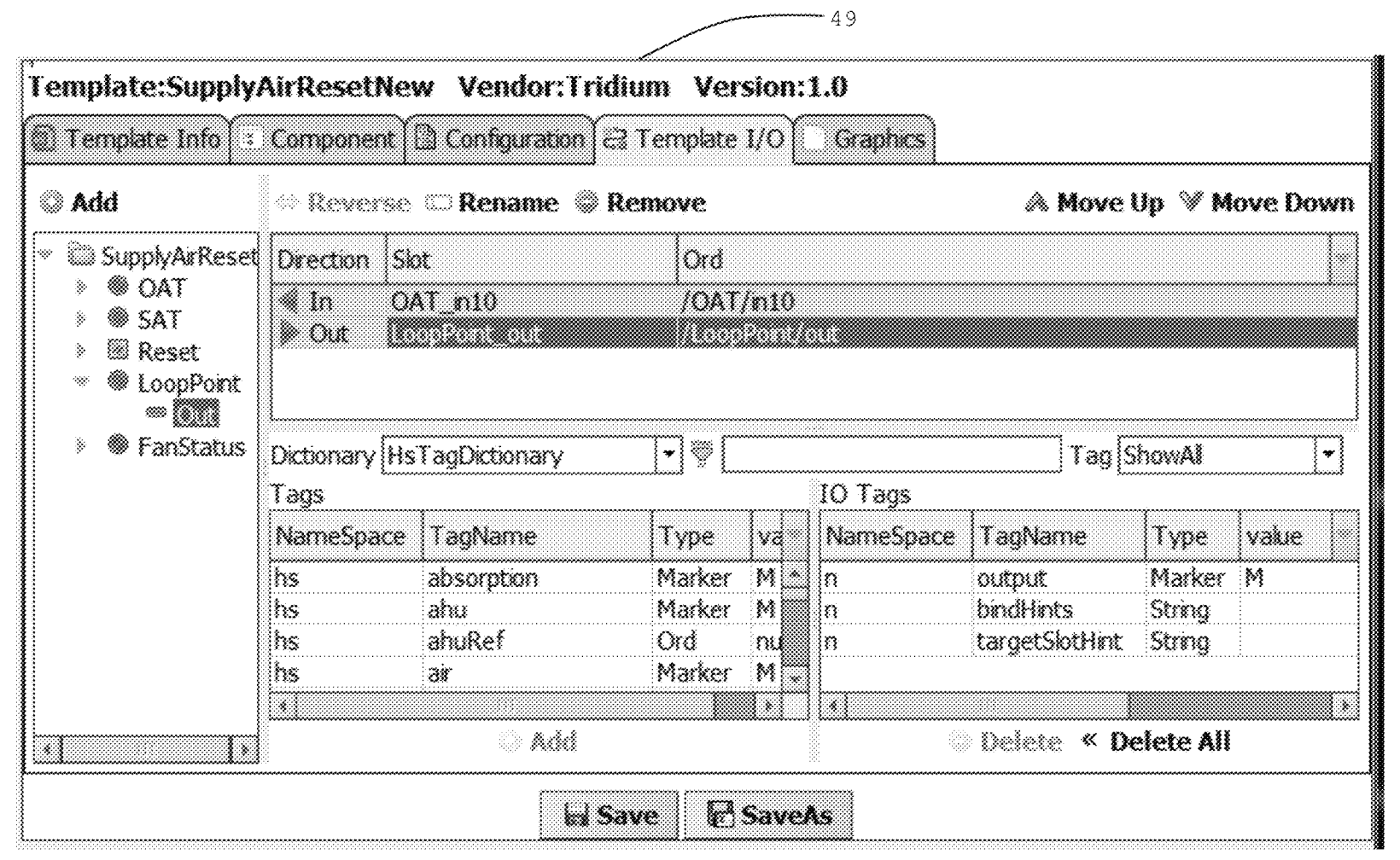

To create a template output is basically the same procedure as creating a template input, except for the fact that one may be typically selecting the "out" property of a control point. One may note screen 49 of FIG. 24. In the IO Tags pane (lower right pane), the addition of n:output, n:bindHints, and targetSlotHint tags may be noted. The tags may be used during template deployment to assist the user in linking the template outputs to other writable points in the station.

One may edit the n:bindHints tag. The tag may be a string value that is used as a neql search predicate. In this particular example, the output may be for the chilled water temperature setpoint and one may be using the HaystackTagDictionary. Therefore, the neql search predicate may be: "hs:chilled and hs:water: and hs:temp and hs:sp". To edit the n:bindHints tag, one may select the bindHints row of the IO Tags pane and double-click on the value cell. A Set Value dialog may popup.

One may edit the n:targetSlotHint tag. The tag may be a string value and may be used to suggest the target slot of any writable points that match the bindHints query. The value may be a comma separated list of inputs. The order of the list may be the order that the deploy tool will suggest the target slot. For example, if the targetSlotHInt tag value is "in10, in13, the deploy tool may first suggest linking to target slot In10 if it was linkable. If it is not linkable, then it may next suggest in13. If neither is linkable, then it might not suggest any particular input and let the user choose. In any case, the user may override the suggested target slot.

Figure 25:
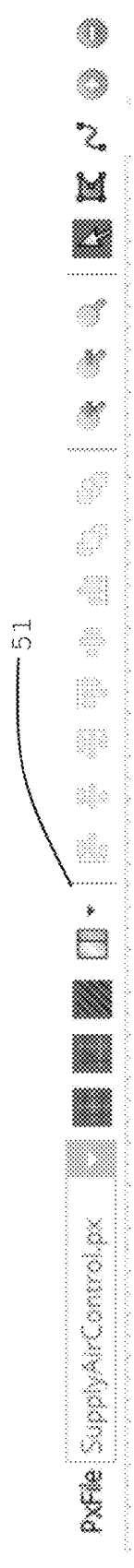
FIG. 25 is a diagram of a pull down for choosing a file where graphic views may be created or modified.

Another step may incorporate 10) Clicking on the Graphics tab. This tab may allow the user create, or modify the graphic views contained in the template. The view is a wrapper view of the PxEditor view. The left pane may be the nav pane and the right pane may be the PxEditor pane. One may note the toolbar at the top of the PxEditor pane. The PxFile pulldown may allow one to choose the PxFile to edit if there are multiple contained in the template. One may note item 51 of FIG. 25. Selecting a PxFile may load the file into the editor and select the component or components in the nav pane that has a view using this PxFile. One may edit the graphic as one would normally do. One may drag items of this view's nav pan and drop onto the edit pane. Virtually all value bindings need to be relative bindings and be forced to relative to the root template component.

Figure 26:
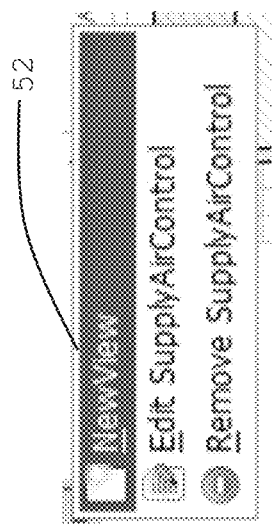
FIG. 26 is a diagram of a dialog with edit and remove commands for a view.
Figure 27:
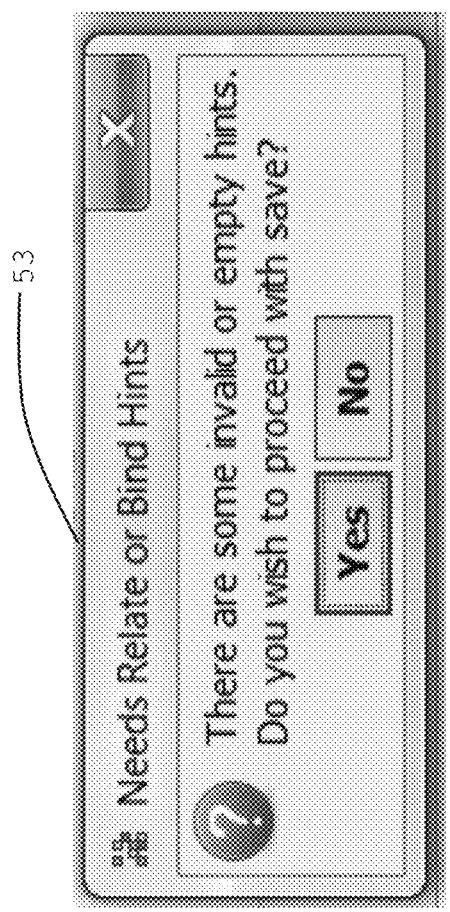
FIG. 27 is a diagram of a dialog that may indicate whether a template has invalid relate or bind hints.

Nav Tree controls may be considered. Right-clicking on a component in the graphic nav pane may allow one to manage graphics associated with that component. Right-clicking in the nav pane white space may provide a SyncTree command, which can select the components in the tree that has a view using the currently selected PxFile. Right-clicking on a nav component that does not have a view defined may provide a NewView command popup. Selecting NewView may allow the user to apply an existing PxView to this component or to create a new PxView. One may note item 52 of FIG. 26. Right-clicking on a nav component that already has a view defined may popup the dialog. If the nav component has multiple views defined, there may be multiple Edits and Remove commands listed, one for each view.

Another step may incorporate 11) Saving the template. Clicking the Save button at the bottom of the template editor view may save the template. This may create a template .ntpl file and store it in the Workbench client's UserHome/templates directory. It may then be available from the Templates side bar. If the template has invalid Relate or Bind Hints, a dialog may popup informing the user.

Figure 28:
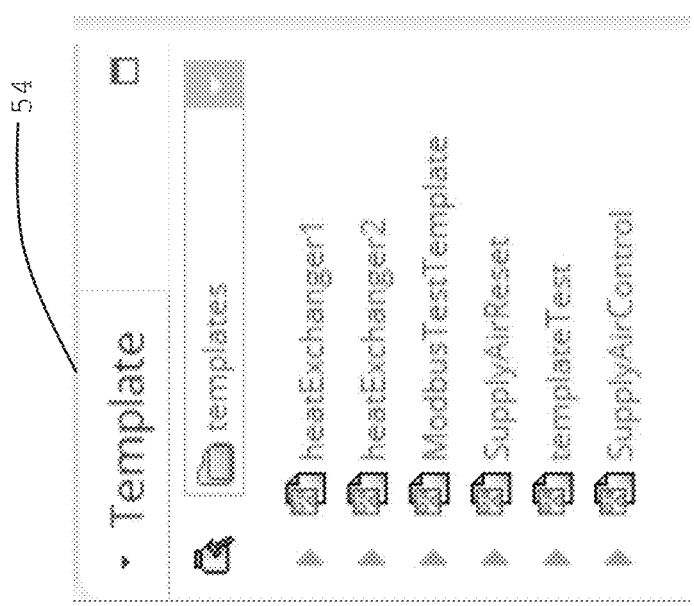
FIG. 28 is a diagram of template side bar that may indicate a list of defined templates installed on a client running workbench.

The template side bar may display the list of defined templates installed on the client PC running workbench. One may see item 54 in FIG. 28. The templates may be stored in the Niagara User Home/templates directory. The template side bar may allow access to templates in the templates folder or in modules in the modules folder. The pull down may switch between viewing the files in the template or module folder. If the module folder is selected, one may expand any module to see the templates it contains. One may double click on a template file in either a module or the template folder to open it in a templateView. The template may be modified and saved. If the template is in a module, it may be opened in the templateView as readOnly and can only be saved as a new template in the template folder. A new variation of a template may be created by opening an existing template and invoking saveAs to save with a new name.

A collection of template files may be combined into a jar file. To create a module of templates, one may view the templates folder. Select one or more template files. One may invoke the make module command by right click and select the command or press the module Icon in the sidebar header. A dialog may appear which allows the module creator to enter module info.

A template may be deployed in different ways. One may drag and drop from the template side bar to the component space, similar to dragging components from a palette. Device rooted templates may be deployed using the Device Manager View.

Template deployment may be a multi-step copy operation that may incorporate copying the component tree to station component space, fixing all links between components, copying px files to the target Jace's file space by copying px files to the px/deploy/templateName directory, prompting the user to edit the configuration properties, and attempting to resolve the template inputs by doing a neql query with the input's n:bindHints; where if only a single source is found, it may automatically create a link from the source; and if multiple sources are found, it may prompt the user to select one.

Figure 29:
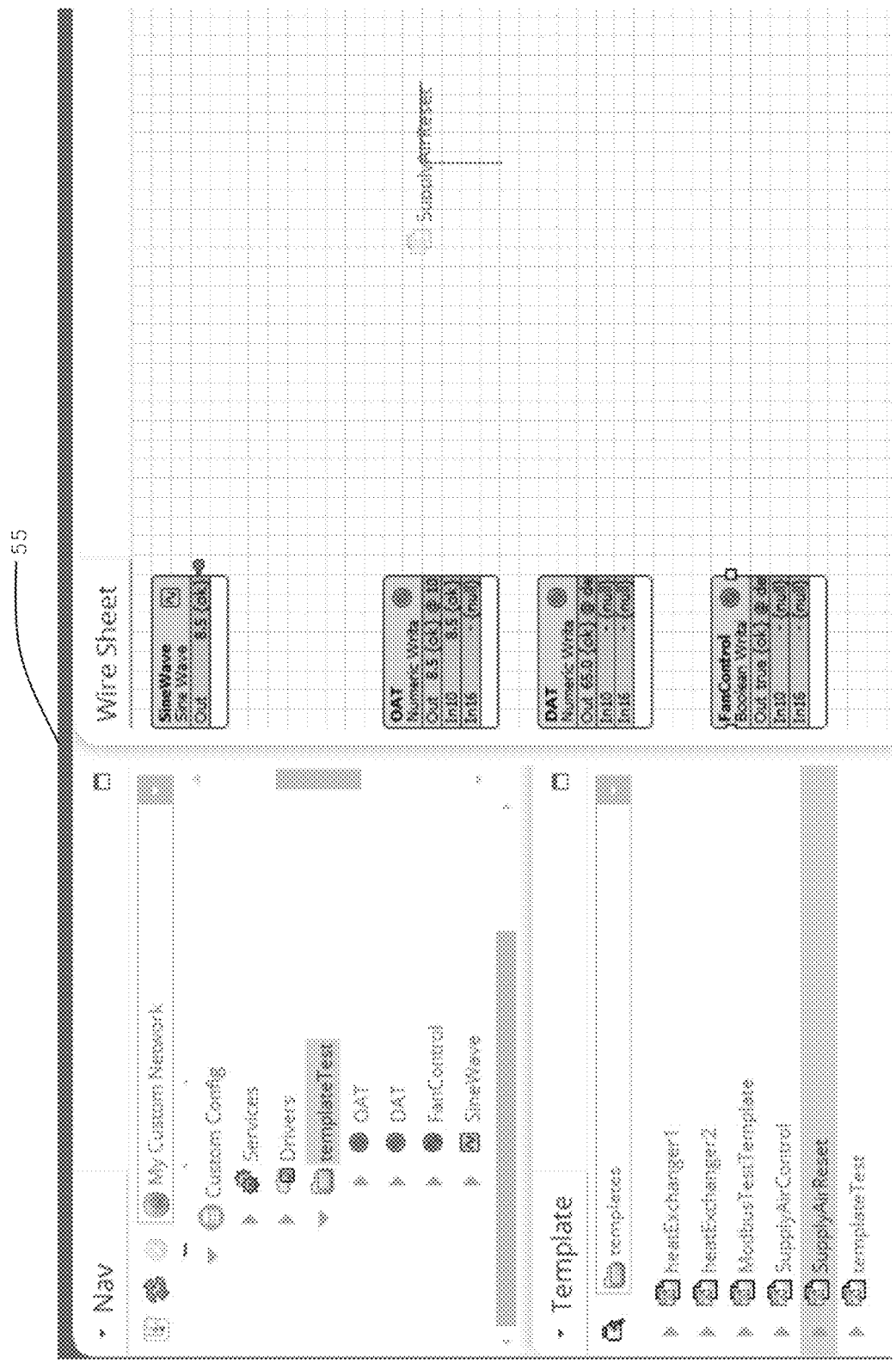
FIG. 29 is a diagram of a screen for dragging and dropping a template.
Figure 30:
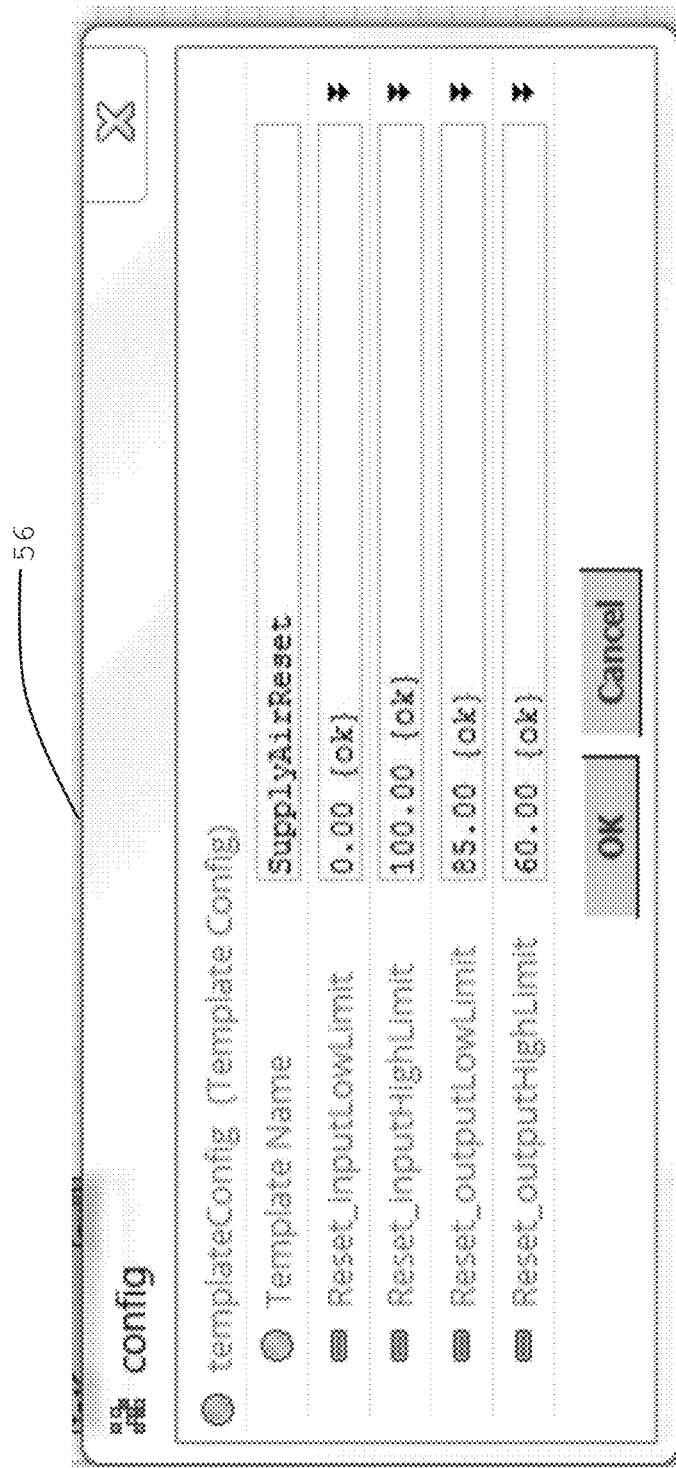
FIG. 30 is a diagram of a configuration dialog for editing configuration properties as desired.

Drag and drop deployment may be incorporate the following numbered items. Screen 55 may be viewed in FIG. 29. 1) One may select and open the wire sheet view where one wishes to add the template. 2) One may left-click on a template in the template side bar and drag and drop it in a desired location. 3) A name dialog may popup. The name may be changed if desired. 4) A config dialog may popup. The configuration properties may be edited as desired. One may look at screen 56 in FIG. 30.

Figure 31:
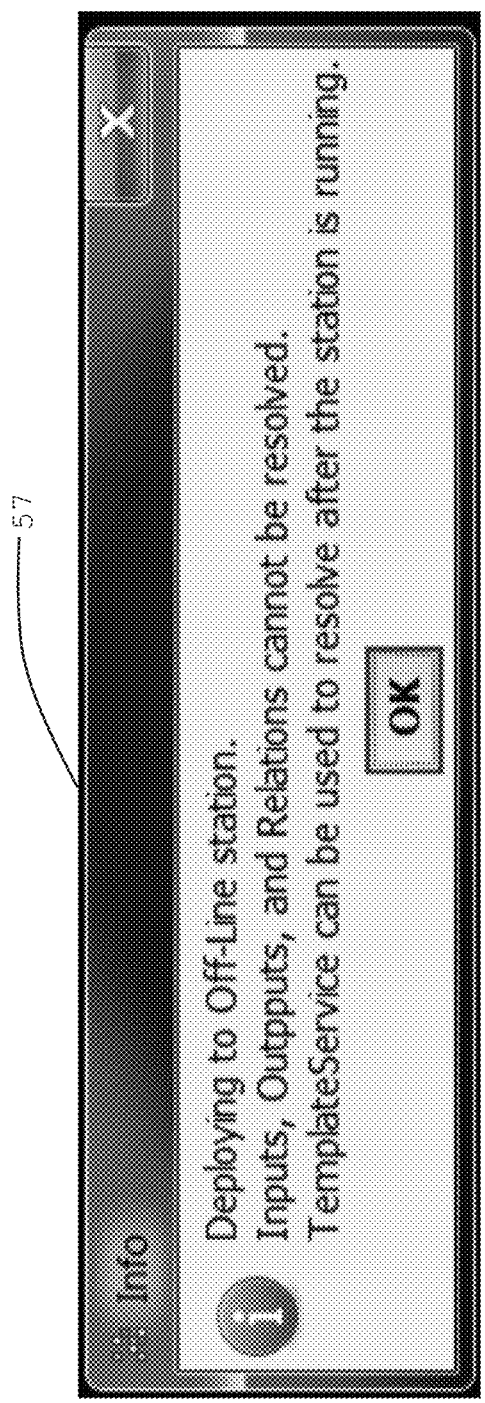
FIG. 31 is a diagram of a dialog may popup in an event that a template is being deployed.

5) If the template is being deployed to an off-line station, a dialog 57 may popup as I FIG. 31. At this point, the deployment may be finished. After the station is running, the TemplateService may be used to resolve any unbound template inputs, outputs, and relations.

Figure 32:
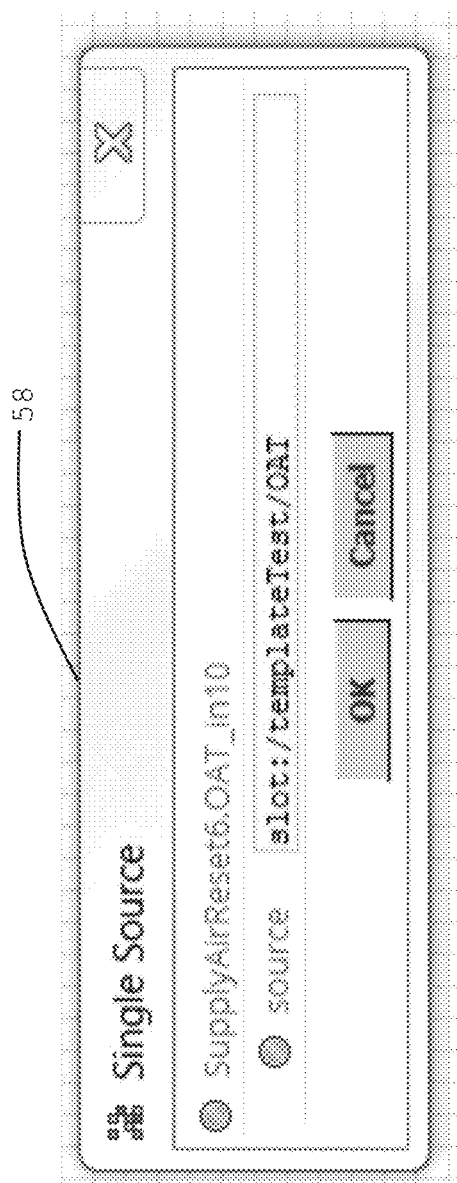
FIG. 32 is a diagram of a confirm dialog that may popup in an event that an input has just a single source.

6) If an input has only a single source, a confirm dialog may popup. One may note dialog 58 in FIG. 32. Selecting OK may be performed to use the input source.

Figure 33:
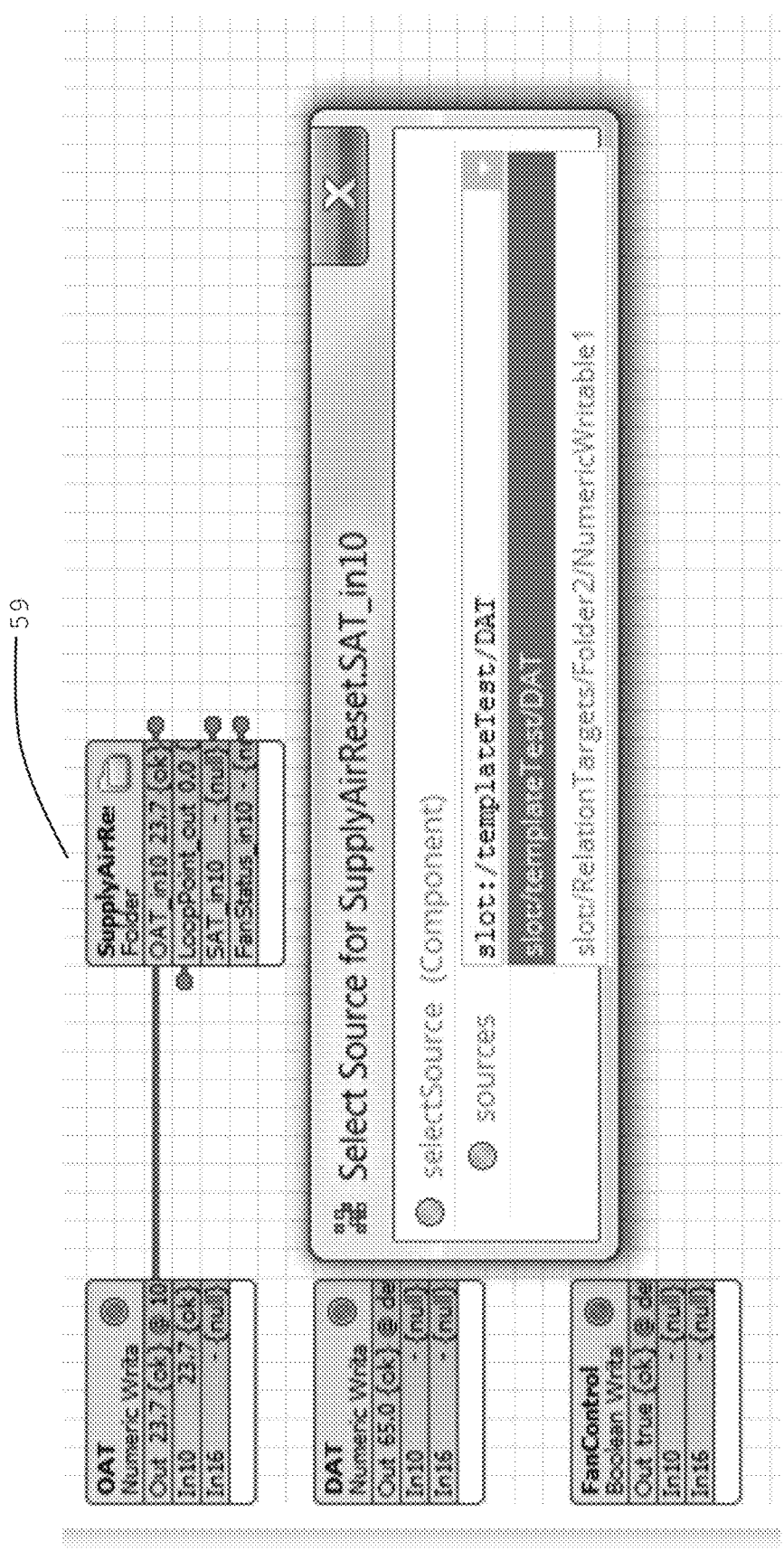
FIG. 33 is a diagram of a select source popup in an event that an input has multiple sources.

7) If an input has multiple sources, a Select Source may popup in screen 59 of FIG. 33. One may select the desired input and click OK. 8) If no sources can be found for an input, an Error dialog may popup indicating the error.

Figure 34:
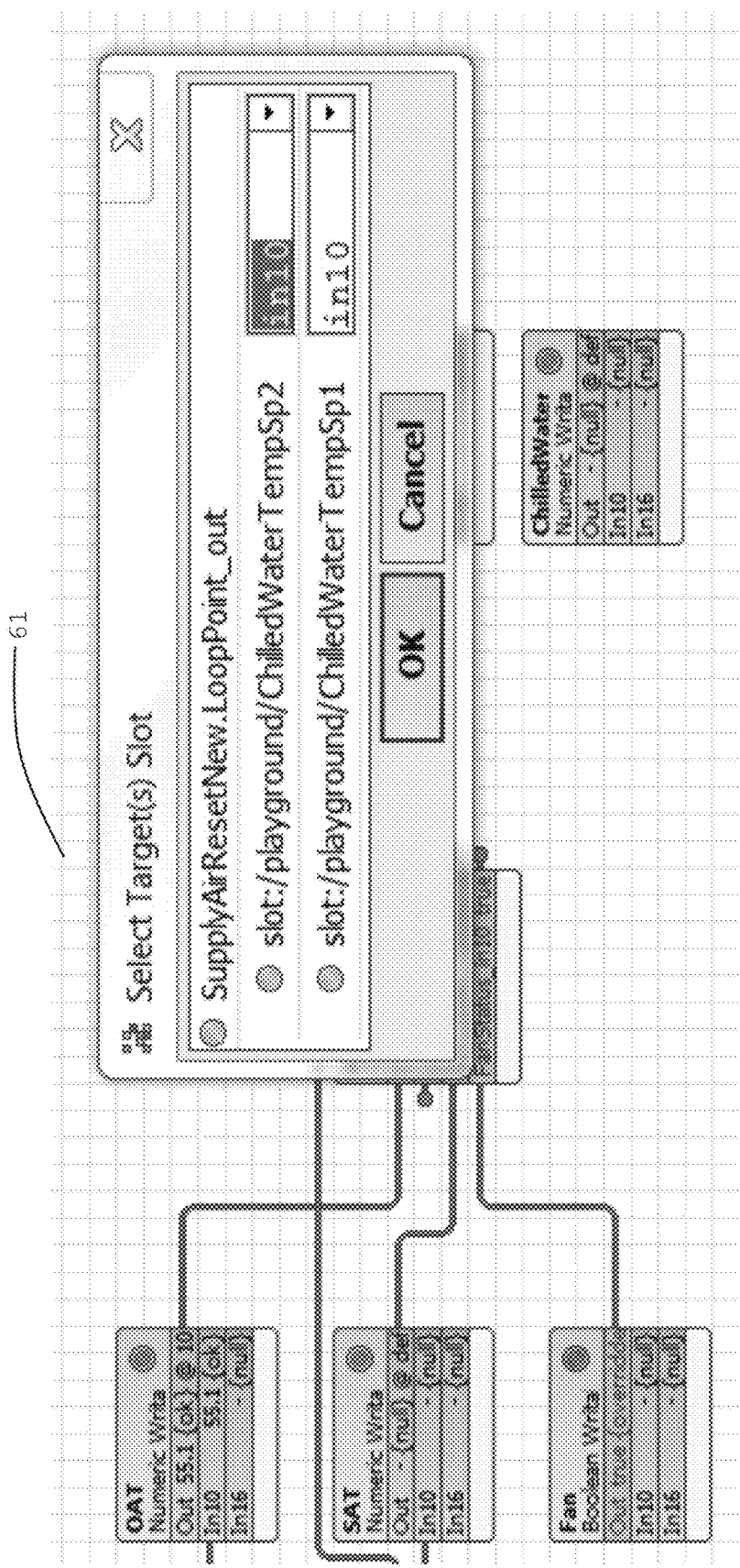
FIG. 34 is a diagram in that for each output, if output matches are found, a select target slot dialog may popup.

9) For each output, if output matches are found, a SelectTarget(s) Slot dialog may popup as indicated in screen 61 of FIG. 34. If multiple points are found, each point may be listed and the target slot selection initialized based on the targetSlotHInt tag value. If none targetSlotHint inputs are linkable, the "-" choice (do not link) may be selected. The target slot choices may be limited to the target point's linkable input slots, i.e., if the in10 input is already linked, it will not necessarily appear in the list. If one does not wish to link to a matching point, one may select the "----" selection.

Figure 35:
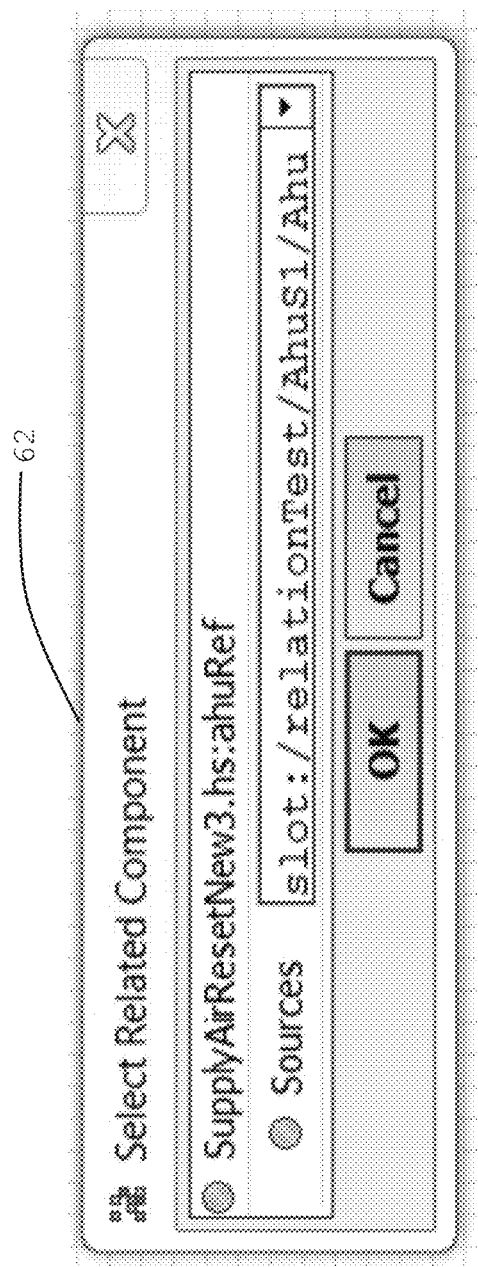
FIG. 35 is a diagram in that if a template has a relation defined and a returned search found potential relation choices, the a select related component dialog may popup for each defined relation.

10) If the template had a relations defined, and the neql search returned found potential relation choices, for each relation defined a Select Related Component dialog 62 may popup as shown in FIG. 35. A desired matching component may be selected.

Figure 36:
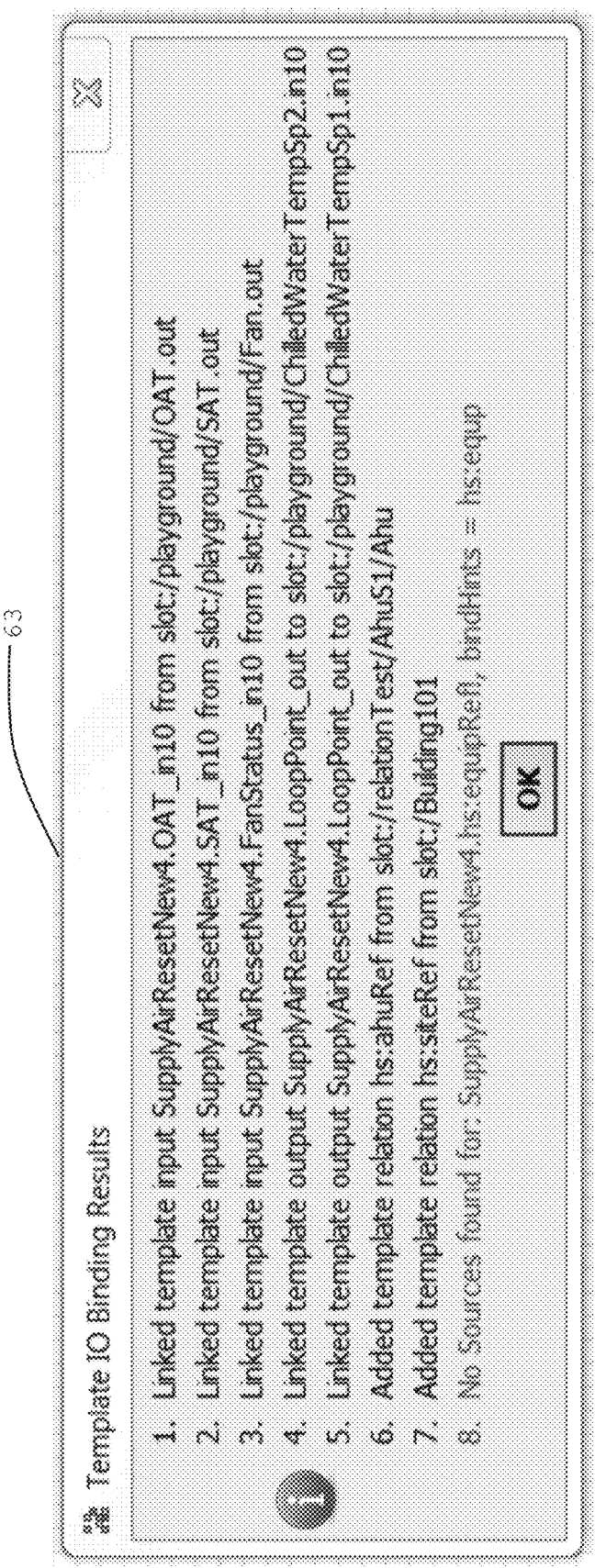
FIG. 36 is a diagram of a popup of an input binding results dialog indicating what links were added.

11) Once all inputs and outputs have been processed, an Input Binding Results dialog 63 may popup indicating what links were added, as indicated in FIG. 36. The input source and output target points may be anywhere in the station. In this example, they just happen on the same wire sheet, so the links may appear obvious. At item 12), the deployment may be complete.

Device manager view deployment may be looked at. The device manager may incorporate support for deploying templates whose base component is an instance of BDevice.

If a driver supports discovery and matching operations, then these mechanisms may allow deployment of templates as well.

Figure 37:
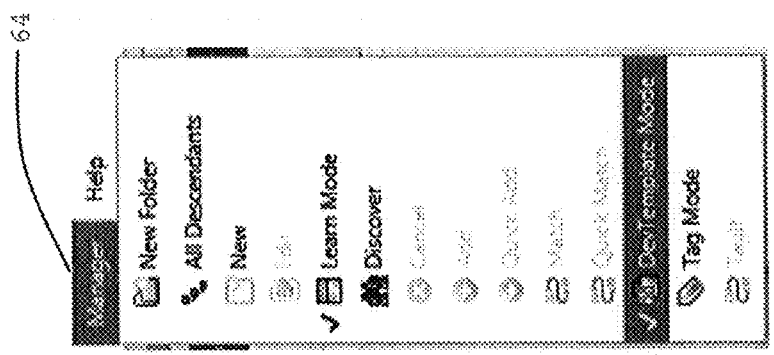
FIG. 37 is a diagram of a manager menu pulldown to select a template mode.
Figure 38:
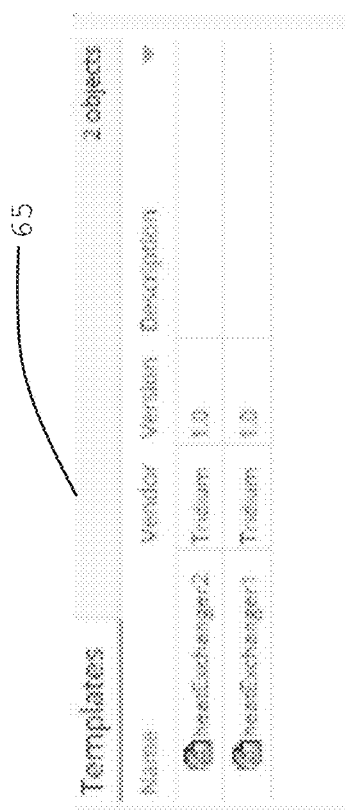
FIG. 38 is a diagram of a template pane that may display a list of templates that are valid for a current network.

The following numbered items may be steps for adding a device template for discovered devices. 1) The Discover command may be invoked on the device manager view. 2) The Template mode may be selected by pressing or the clicking the template mode button on the toolbar or the "DevTemplate Mode" from the Manager Menu pulldown in item 64 of FIG. 37. This may open the Template pane which can display a list of templates that are valid for the network. Item 65 of FIG. 38 may be noted. 3) Select one or more devices from the discovered pane. The templates displayed may change to display the templates valid/matchable for the selected Discovered devices. 4) With one or more Discovered devices of the same type selected, one may select the desired template to add for these discovered devices.

Figure 39:
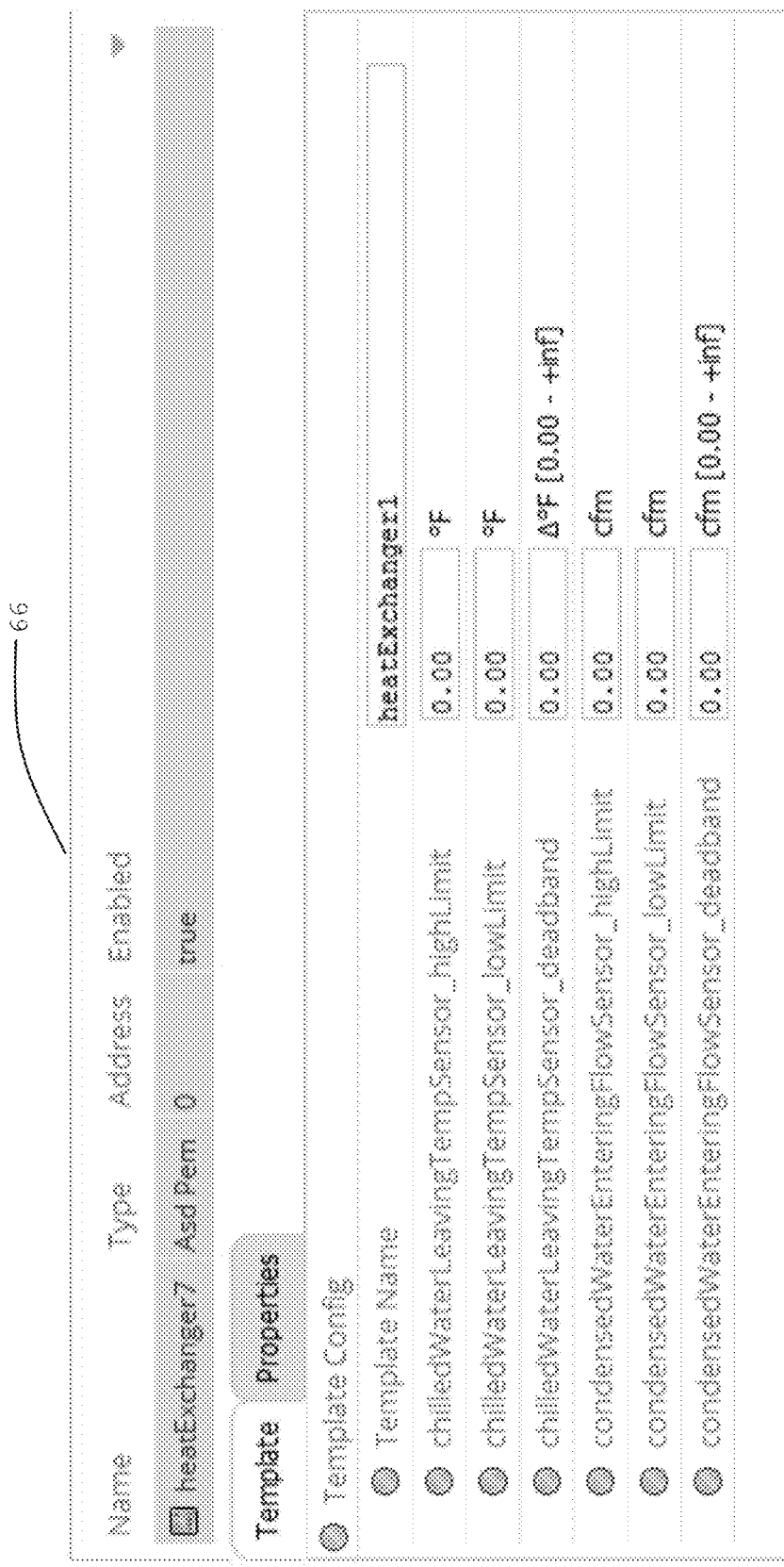
FIGS. 39 and 40 are diagrams of screens for a selected template tab and a properties tab, respectively.
Figure 40:
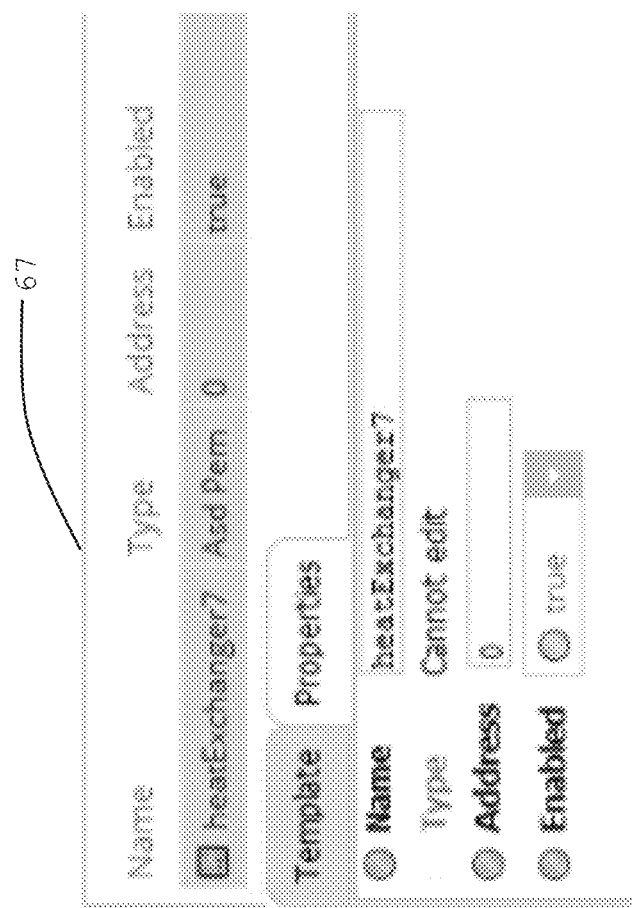

5) The Add button may be clicked to add instances of the selected template and then automatically match with the selected discovered devices. The selected template may be deployed for each of the selected devices. At this time, the template inputs may be linked. The user may be prompted to select a specific source when multiple sources are found. The user may then be prompted with an edit dialog, for example, a Manager Edit Dialog, that displays a list of devices being added at pane 66 of FIG. 39 and tabbed pane 67 of FIG. 40. The Template tab may allow the user to edit the template configuration properties and the Properties tab may allow the user to edit the typical edit properties for the device. The user may select each device to make desired edits. This approach may be done at step 6). Unmatched templates may be added to the station by double-clicking on a template or dragging a template and dropping on the Database table. The user may be prompted for template input sources and template configuration edit changes, in the same manner as indicated above. In the present case, the device may be manually addressed or matched at a later time.

The Template Manager, item 68 in FIG. 41, is the primary view on the Template Service. This view may display the deployed templates in the station, its location, the Template Name, the Vendor, Version, the number of Inputs, Outputs and Relations for each. If a deployed template has any unlinked inputs, outputs or relations, it may have a fault background color.

Figure 42:
FIG. 42 is a diagram of the view showing the template manager with a GoTo popup.
Figure 43:
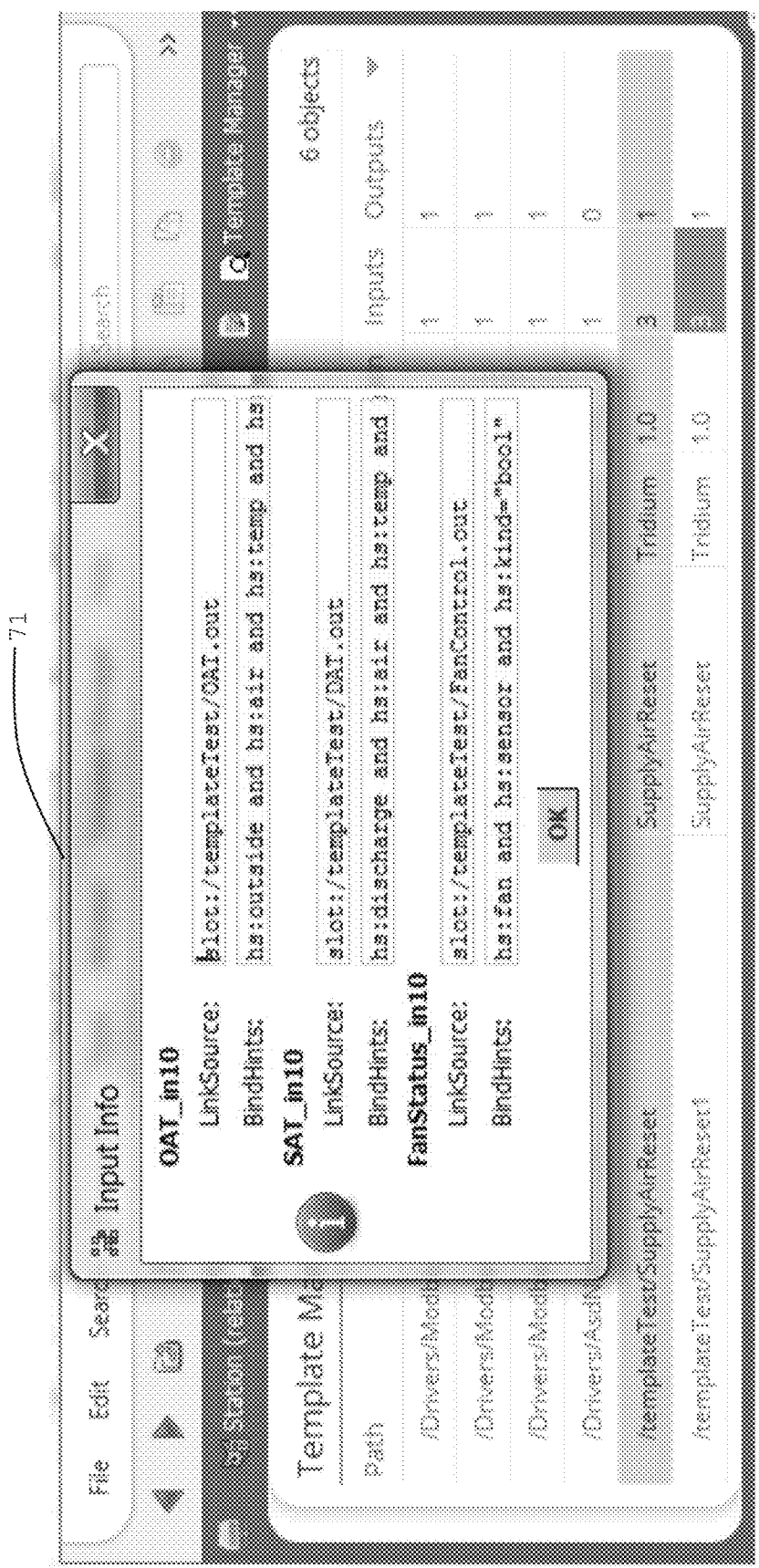
FIG. 43 is a diagram of a popup showing additional information about inputs of a deployed template.

A control function may incorporate the following numerically indicated steps. Item 69 of FIG. 42 may be noted. 1) GoTo may be Navigate to default view of the root component of this deployed template. It may be invoke by double-clicking on the desired Path cell or right-clicking on the desired Path cell and then clicking on the GoTo popup. 2) GoToParent may be Navigate to the default view of the template root component's parent. 3) Input Info may provide additional information about the inputs of a deployed template. It may be invoked by double-clicking on the desired Inputs cell. One may see item 71 in FIG. 43. If an input was not linked, it may be indicated as "NOT LINKED!" in the LinkSource: field.

Figure 44:
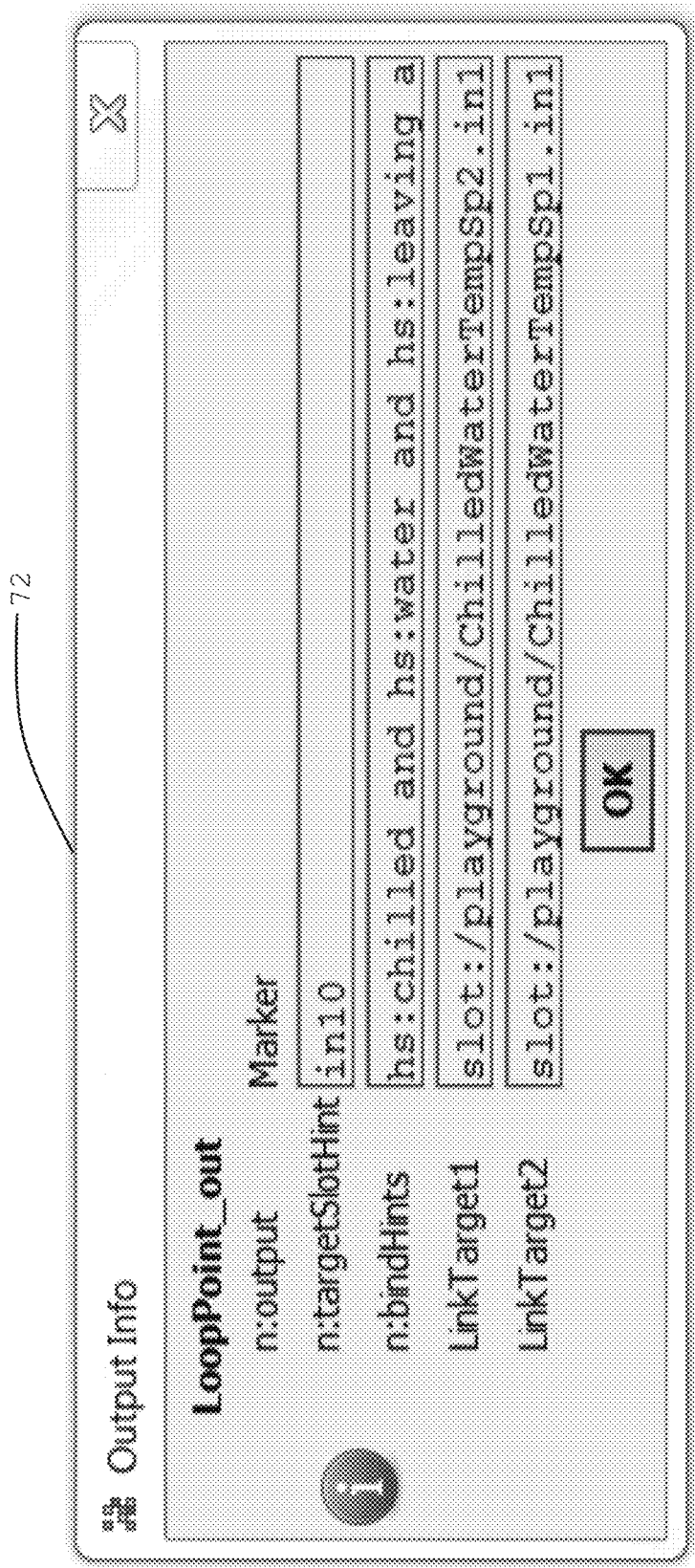
FIG. 44 is a diagram of a popup showing additional information about the outputs of a deployed template.

4) Output Info may provide additional information about the outputs of a deployed template. It may be invoked by double-clicking on the desired output cell. Item 72 of FIG. 44 may be noted.

Figure 45:
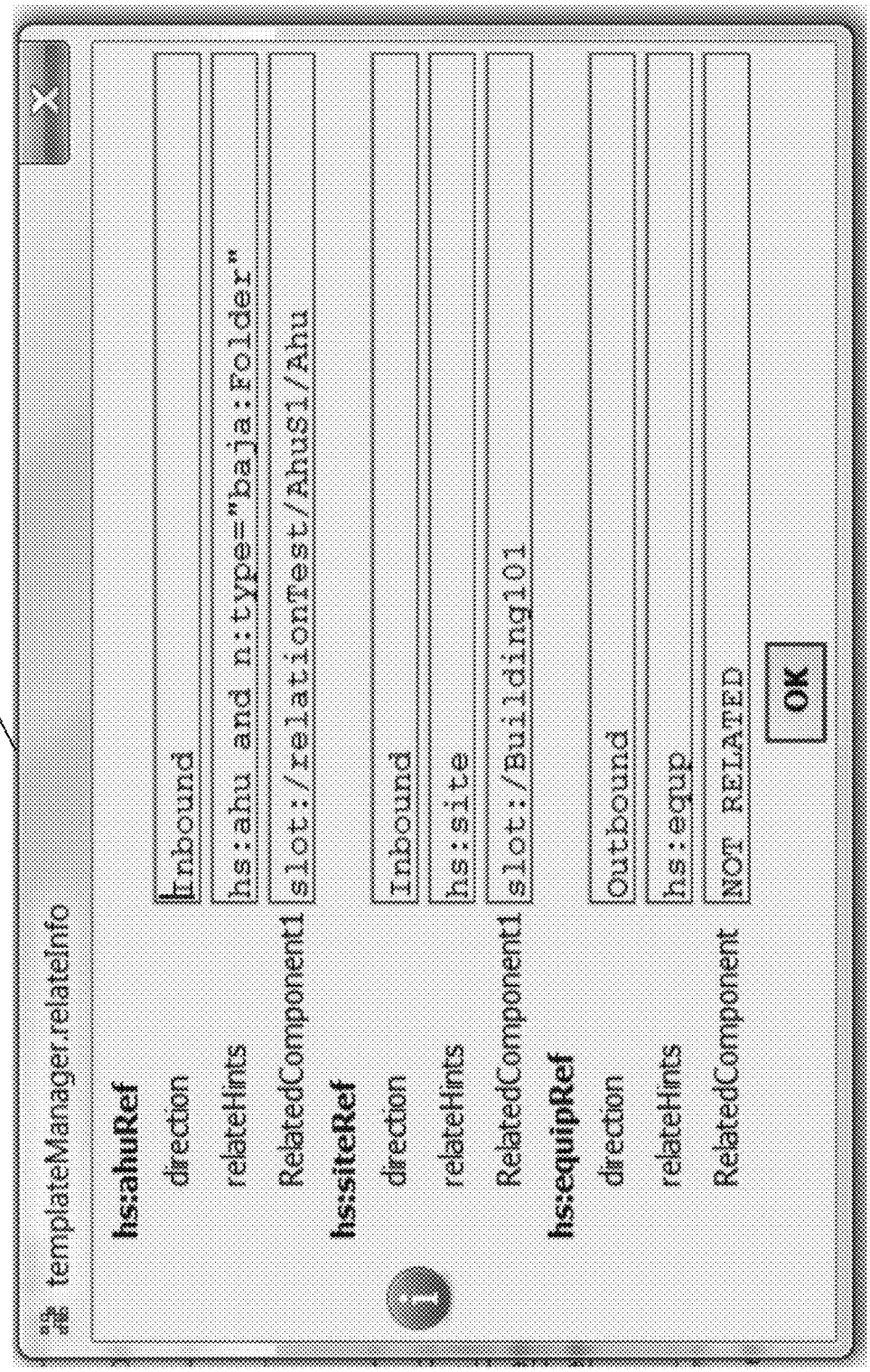
FIG. 45 is a diagram of a popup showing additional information about relations defined in a deployed template.

5) Relation Info may provide additional information about the Relations defined in the deployed template. It may be invoke by double-clicking on the desired relations cell. One may note item 73 in FIG. 45.

6) Linking Unlinked Inputs, Outputs and Relations may assist in linking any unlinked template inputs, outputs and relations. This may be invoked by right-clicking on the desired input, output or relations cell. Item 74 of FIG. 46 may be considered. A popup may appear listing the inputs that are unlinked. One may be selected by clicking on it. If it resolves to a single source, it may prompt for an Ok. If it resolves to multiple sources, it may prompt the user to make a choice. If it still does not resolve, it may pop up a dialog indicating that fact.

Figure 47:
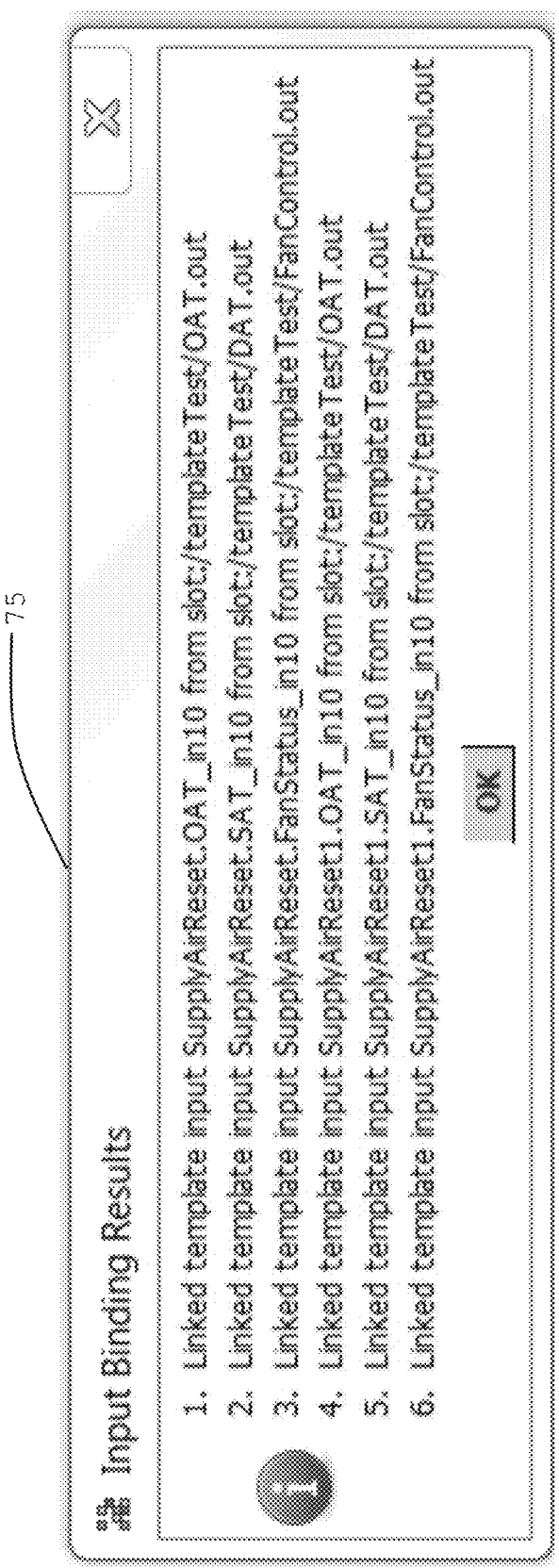
FIG. 47 is a diagram of a popup indicating input binding results due to remembered choices made by a user relative to each template type and input.

Another step, 7) Batch Resolution of UnLinked Inputs, Outputs and Relations may provide a way of selecting multiple deployed templates and attempting to link all of the selected templates with unlinked inputs or outputs. It may be invoked by selecting multiple rows in the Template Manager Table and then right-clicking on one of the selected rows. A menu item LinkUnboundIO may pop up. One may click on this item to start the process. A feature in the process, the system may remember the choices made by the user for each template type and input. If there are any additional template instances of the same type, it may use the same choices, so as not to prompt the user for the same information again. When completed, a dialog may pop up indicating what happened. Item 75 of FIG. 47 may be viewed.

To recap, a mechanism for auto binding templates into one or more existing processing systems, may incorporate a processor, a memory connected to the processor, a user interface connected to the processor, and one or more templates situated in the memory. The one or more templates may be packaged sets of control logic. A template of the one or more templates may be deployed into a system to satisfy one or more needs of the system. Deployment of the template may require binding. The template may have one or more entities that require binding upon deployment. Each entity that requires binding may be provided with a semantic having binding hints. The binding hints may be a search predicate in a query for each entity that requires binding. The query may automatically be executed against a control space.

If there is one result from the query, then the entity may be automatically bound. If there are two or more results from the query, then one result may be selected before the entity is bound. One or more packaged sets of control logic may be selected from a group incorporating a user interface, graphics, alarms, data collections, configuration properties, inputs, outputs, and relations.

When a template is deployed into the system, one or more binding operations may be performed. One or more binding operations may be selected from a group incorporating hardware bindings, input bindings, output bindings, and relationship bindings.

A Niagara™ framework may provide a basis within the processor, memory, and user interface.

An approach for binding templates may incorporate connecting a memory to a processor, connecting a user interface to the processor, entering one or more templates into the memory, and deploying one or more templates into a system to satisfy one or more needs of the system. A template may have one or more entities that require binding upon deployment. Each entity that requires binding may be provided with a semantic having binding hints. Binding hints may be a search predicate in a query.

The one or more templates may be packaged sets of control logic.

A query may be automatically executed against a control space.

Each entity that requires binding may have a query.

One or more packaged sets of control logic may be selected from a group incorporating a user interface, graphics, alarms, data collection, configuration properties, inputs, outputs, and relations.

When a template is deployed into the system, one or more binding operations may be performed. One or more binding operations may be selected from a group incorporating hardware bindings, input bindings, output bindings, and relationship bindings.

A Niagara™ framework may provide a basis within the processor, memory and user interface.

A system for auto binding templates may incorporate a processor, a memory connected to the processor, and one or more templates situated in the memory. A template of the one or more templates may be deployed into a controller. The template may have one or more entities that require binding upon deployment. Each binding that needs binding may be provided with a semantic having binding hints. Binding hints may be a search predicate in a query.

When a template is deployed into the controller, one or more binding operations may be performed. One or more binding operations may be selected from a group incorporating hardware bindings, input bindings, output bindings, and relationship bindings.

The one or more templates may be sets of control logic.

The system may further incorporate a user interface connected to the processor.

A template may be deployed to satisfy one or more needs of the controller.

A search query may be executed against a control space.

If there is only one result from a query, then an entity may be bound. If there are two or more results from the query, then one result may be selected before an entity is bound.

An operating basis for the processor, a memory or user interface may incorporate a Niagara™ framework.

Any publication or patent document noted herein is hereby incorporated by reference to the same extent as if each individual publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A mechanism for auto binding templates into one or more existing processing systems, comprising:
a processor;
a memory connected to the processor;
a user interface connected to the processor; and
one or more templates situated in the memory; and
wherein:
the one or more templates are packaged sets of control logic;
a template of the one or more templates can be deployed into a system to satisfy one or more needs of the system;
deployment of the template requires binding;
the template has one or more entities that require binding upon deployment;
each entity that requires binding is provided with a semantic having binding hints;
the binding hints are a search predicate in a query for each entity that requires binding; and
the query is automatically executed against a control space.

2. The mechanism of claim 1, wherein:
if there is one result from the query, then the entity is automatically bound; and
if there are two or more results from the query, then one result is selected before the entity is bound.

3. The mechanism of claim 2, wherein one or more packaged sets of control logic are selected from a group comprising a user interface, graphics, alarms, data collections, configuration properties, inputs, outputs, and relations.

4. The mechanism of claim 1, wherein:
when a template is deployed into the system, one or more binding operations are performed; and
one or more binding operations are selected from a group comprising hardware bindings, input bindings, output bindings, and relationship bindings.

5. The mechanism of claim 1, wherein a Niagara™ framework provides a basis within the processor, memory, and user interface.

6. A method for binding templates comprising:
connecting a memory to a processor;
connecting a user interface to the processor;
entering one or more templates into the memory; and
deploying one or more templates into a system to satisfy one or more needs of the system; and
wherein:
a template has one or more entities that require binding upon deployment;
each entity that requires binding is provided with a semantic having binding hints;
binding hints are a search predicate in a query for each entity that requires a binding;
the one or more templates are packaged sets of control logic; and
a query is automatically executed against a control space.

7. The method of claim 6, wherein one or more packaged sets of control logic are selected from a group comprising a user interface, graphics, alarms, data collection, configuration properties, inputs, outputs, and relations.

8. The method of claim 6, wherein:
when a template is deployed into the system, one or more binding operations are performed; and
one or more binding operations are selected from a group comprising hardware bindings, input bindings, output bindings, and relationship bindings.

9. The method of claim 6, wherein a Niagara™ framework provides a basis within the processor, memory and user interface.

10. A system for auto binding templates comprising:
a processor;
a memory connected to the processor;
a user interface connected to the processor; and
one or more templates situated in the memory; and
wherein:
a template of the one or more templates is deployed into a controller to satisfy one or more needs of the controller;
the template has one or more entities that require binding upon deployment;
each entity that needs binding is provided with a semantic having binding hints;

binding hints are a search predicate in a query for each entity that requires binding;

the one or more templates are sets of control logic; and a search query is executed against a control space.

11. The system of claim 10, wherein when a template is deployed into the controller, one or more binding operations are performed; and one or more binding operations are selected from a group comprising hardware bindings, input bindings, output bindings, and relationship bindings.

12. The system of claim 10, wherein:

if there is only one result from a query, then an entity is bound; and if there are two or more results from the query, then one result is selected before an entity is bound.

13. The system of claim 10, wherein an operating basis for the processor, a memory or user interface comprises a Niagara™ framework.

* * * * *